(12) United States Patent
Orfanoudakis et al.

(10) Patent No.: US 11,705,846 B2
(45) Date of Patent: Jul. 18, 2023

(54) APPARATUS AND METHODS TO CONTROL ELECTRIC MOTORS

(71) Applicants: MAGNETIC PUMPING SOLUTIONS LIMITED, Oxford (GB); MAGNETIC PUMPING SOLUTIONS, LLC, Houston, TX (US)

(72) Inventors: Georgios Orfanoudakis, Heraklion (GR); Michael Yuratich, Hampshire (GB)

(*) Notice: Subject to any disclaimer, the term of this patent is extended or adjusted under 35 U.S.C. 154(b) by 64 days.

(21) Appl. No.: 17/593,867

(22) PCT Filed: Mar. 27, 2020

(86) PCT No.: PCT/US2020/025342
§ 371 (c)(1),
(2) Date: Sep. 27, 2021

(87) PCT Pub. No.: WO2020/198629
PCT Pub. Date: Oct. 1, 2020

(65) Prior Publication Data
US 2022/0181999 A1    Jun. 9, 2022

Related U.S. Application Data

(60) Provisional application No. 62/824,480, filed on Mar. 27, 2019.

(51) Int. Cl.
*H02P 6/20* (2016.01)
*H02P 21/34* (2016.01)

(52) U.S. Cl.
CPC ............ *H02P 21/34* (2016.02); *H02P 6/20* (2013.01); *H02P 2209/09* (2013.01)

(58) Field of Classification Search
CPC ......... H02P 21/34; H02P 6/20; H02P 2209/09
See application file for complete search history.

(56) References Cited

U.S. PATENT DOCUMENTS

| | | | | |
|---|---|---|---|---|
| 7,622,877 B2 * | 11/2009 | Schulz | ............... | H02P 21/0089 318/434 |
| 8,092,190 B2 * | 1/2012 | Leuthen | .............. | F04D 15/0066 417/44.1 |
| 8,471,518 B2 | 6/2013 | Nishiguchi et al. | | |
| 8,513,911 B2 | 8/2013 | Jones et al. | | |
| 8,672,641 B2 * | 3/2014 | Yuratich | .................. | H02K 7/09 417/44.1 |
| 10,044,306 B2 | 8/2018 | Ademoye | | |
| 2007/0069669 A1 * | 3/2007 | MacKay | .................. | H02P 6/20 318/400.12 |
| 2007/0096571 A1 * | 5/2007 | Yuratich | ................... | H02K 9/00 310/90 |
| 2011/0241580 A1 | 10/2011 | Winterhalter et al. | | |

(Continued)

FOREIGN PATENT DOCUMENTS

WO       2018157120 A1    8/2018

*Primary Examiner* — Rina I Duda
(74) *Attorney, Agent, or Firm* — Matthew J Patterson

(57) ABSTRACT

Apparatus and methods for controlling electric motors are disclosed. In addition, such apparatus and methods for starting and controlling electric motors and controlling electric motors switching from a PWM control to six step method of control. Methods and apparatus are further included to provide for robust control of an electric motor operating in a six-step running mode.

36 Claims, 11 Drawing Sheets

(56) References Cited

U.S. PATENT DOCUMENTS

2015/0381081 A1* 12/2015 Bhangu .................. H02P 21/18
                                                         318/400.05
2017/0126160 A1*  5/2017 Ademoye ............. E21B 43/128
2017/0138159 A1*  5/2017 Hoyte .................. G05D 7/0676

* cited by examiner

APPARATUS AND METHODS TO CONTROL ELECTRIC MOTORS

CROSS REFERENCE TO RELATED APPLICATIONS

This application claims the benefit of U.S. Provisional Patent Application Ser. No. 62/824,480 filed 27 Mar. 2019 as well as Patent Cooperation Treaty Patent Application Serial No PCT/US2020/025342 filed 27 Mar. 2020. The disclosures of the applications above are incorporated herein by reference in their entirety.

FIELD OF THE INVENTION

Embodiments of the disclosure generally relate to electric motors and more particularly to apparatus and methods for controlling an electric motor that provides a smooth transition from pulse width modulation to six-step control.

DESCRIPTION OF THE RELATED ART

Electric Submersible Pumping Systems

Downhole pumping systems are a widely used method of artificial lift, whereby a pump and electric motor deployed in a borehole is used to bring liquid and gas to surface. Artificial lift is necessary when the natural well pressure is insufficient to do so by itself. The motor is powered via a length of electric cable rising to surface and thence connected to control equipment.

Referring to FIG. 1, there is shown a typical downhole pumping system installed in a wellbore. As is known, a borehole drilled in an earth formation 1 may be lined with casing 2 cemented to the surrounding formation. A motor 10 is coupled to a pump 12 via a motor seal 11. The pump discharge end 13 is attached to production tubing 3. Production fluid (not shown) enters the well via perforations 4 in the casing 2 and enters the pump at its intake 14. The production tubing 3 runs up the borehole through the wellhead 6 and on to surface production facilities. In a typical installation, motor 10 comprises a three-phase motor and is powered via a three-conductor electric cable 15, which runs up to surface alongside and clamped to the production tubing 3 in a manner well known in the art. The cable 15 then penetrates through the wellhead 6 and runs to a vented junction box 20. In the embodiment shown, surface electric power 21 is converted by variable speed drive unit 22 to a frequency and scaled voltage needed by the motor 10, allowing for voltage drop in cable 15. The scaled voltage is then increased to the actual voltage needed by the motor 10, by step-up transformer 23. The output of the transformer 23 is connected in the vented junction box 20 to motor cable 15. Variable speed drives permit optimization of production and energy savings and for this reason are widely used in submersible pumping for conventional induction motors (IMs). A variable speed drive is required for permanent magnet motors (PMMs) due to the need for reliable synchronous control.

The predominant prior art method for controlling downhole AC motors using electric drives are variable speed drives employing scalar control, which only adjusts the magnitude and frequency of the voltages applied to the motor. Scalar control does not use the motor shaft angular position. For PMMs, scalar control assumes that the motor is running at the synchronous speed corresponding to the predetermined drive output frequency and is unreliable in that it can easily lose control. Another method of controlling AC motors (and downhole pumping systems thereby) using variable speed drive 22 is vector control. As opposed to scalar control, vector control methods usually require knowledge of the shaft angular position and speed, which for downhole motors is typically provided by an observer, also known as an estimator. An observer typically comprises an electrical model of the motor, surface measurements of voltage and current and a phase-locked loop (PLL). A PLL can be digitally implemented in the form of an algorithm, providing an estimate of the phase and frequency of a periodic input signal such as the drive output voltage or current. Control methods using such observers are known as sensorless in that they do not require physical shaft rotation sensors. They are particularly useful for downhole applications, where the motors are positioned remotely from the drives that control them. Not all vector control drives employ observers directly, but sensorless vector drives share the use of a motor model and surface electrical measurements to accurately control the torque-producing component of the motor current. For a PMM, this is sensibly the actual motor current whereas for induction motors (IMs) the motor current also contains a magnetizing current component. In general, vector controls are fast and accurate electronic controllers that tightly regulate the torque producing motor current, with or without an observer, and may be applied to both induction motors and permanent magnet motors.

Pulse-Width Modulation—PWM

Modern industrial motor drives generally use pulse width modulation (PWM) to generate approximately sinusoidal output voltages and currents. A typical drive 200 (FIG. 2) comprises a connection to the power supply 201, an input converter 202 to convert the supply AC voltage to a DC bus voltage 203, usually smoothed by a capacitor 204, and a multi-phase output inverter stage 205 that switches between the lower and upper bus voltages to produce output voltage pulses 206 on each phase. The converter 202 and inverter 205 hardware are controlled by respective converter controller 207 and inverter controller 208 implemented, for example, in software and programmable logic.

When using PWM, the bus voltage 203 is generally at a fixed level corresponding to the rectified supplied voltage. The output voltage pulses 206 are thus of nominally constant amplitude equal to the instantaneous bus voltage and are produced at a steady rate, the switching rate. The successive pulse widths are varied by control algorithms on a pulse by pulse basis to produce an average voltage in each switching period approximately equal to the amplitude in that period of the actual sinusoidal voltage being emulated. In order to produce a good representation of the sinusoidal output the pulse switch rate is typically 20-40 or more times that of the motor electrical frequency. The resulting nearly sinusoidal motor currents are optimum for motor performance and efficiency.

Six-Step Control

Prior to the introduction of fast power electronics switching devices like insulated gate bipolar transistors (IGBTs) it was infeasible to generate high quality PWM. One method that can be used is known as six-step (FIG. 3). In this method, the output switching devices are switched with a single pulse per motor electrical cycle, so producing square wave voltages 301, 302, 303 on each phase. A line (phase to phase) voltage as seen by the drive load is shown as 304. This method was widely used in early scalar drives. The fundamental frequency component of the line voltage seen by the motor is substantial despite its high harmonic distortion, and the resulting motor current contains a significant torque-producing fundamental component. Nevertheless, the harmonic distortion does increase the harmonic power losses in the motor and related equipment, with a resultant temperature rise. For downhole applications this can be a significant limitation on the motor loading.

Six-step switching results in a fundamental frequency voltage amplitude proportional to the bus voltage and, in the absence of voltage losses in the switching devices, the phase fundamental frequency peak voltage output would be $2/\pi$ times the bus voltage. In order to vary the amplitude of the fundamental output voltage it is necessary to vary the bus voltage. This can be done using a variable voltage converter 202 (FIG. 2). Known variable voltage converters include controlled rectifiers, voltage buck and/or boost controllers and inverters run at negative power factor ("active front end"). The thyristors used in controlled rectifiers are phase controllers that drop varying intervals of the incoming supply voltage cycles, thus varying the charging of the bus capacitance 204 and hence varying the bus voltage 203. Since a thyristor can only be controlled in synchronism with the incoming supply voltage, which is typically 50 Hz or 60 Hz, bus voltage control is relatively slow. The slow response of the bus and the infrequency of the output voltage switching together make a six-step drive generally unsuited to dynamic synchronous control applications.

Vector Control Structure

FIG. 4 shows the well-known structure of an electric drive in the form of a vector controller 400. Motor phases a, b, c have measured alternating currents $i_a$, $i_b$, $i_c$ collectively denoted $i_{abc}$ 401, which are converted to quadrature currents $i_d$ 402 and $i_q$ 403 collectively denoted as vector $i_{dq}$ using the known Park-Clark transformation 404 to the rotating rotor frame of reference, where $\theta$ is the instantaneous rotor angle 405. The angle 405 is derived from a shaft encoder or observer as hereinbefore outlined. The dq and abc notations are widely used and will be understood by one working in the field of motor control. A digital controller, such as PI controller 406 is used to hold the $i_d$ current 402 to the direct reference current $i_{dref}$ 407, which is zero except in special applications such as field weakening and for induction motors to regulate the rotor field. A second PI regulator 408 is used to hold the $i_q$ current 403 to the reference value $i_{qref}$ 409. The $i_q$ current 403 is the torque-producing current and typically $i_{qref}$ 409 is set to a required value or by the output of a simple speed control loop here shown as a digital controller, specifically PI controller 410 based using speed reference 411 and measured or estimated speed feedback 412 such that if the speed is too low more current is requested and vice versa. The output of the PI controllers 406, 408 is direct voltage $v_d$ 413 (or in-phase voltage) and quadrature voltage $v_q$ 414 collectively denoted as vector $v_{dq}$. Inverse transformation 415 transforms them back to the demanded phase voltages $v_{abc}$ 416. The modulator 417 converts these demanded voltages to the pulse widths needed in PWM for the inverter to generate the actual drive output voltages. For clarity, the modulator 417 is shown separately from the inverse transformation 415, but it is common in, for example, space vector pulse width modulation (SVPWM, SVM) to convert directly from dq to the inverter pulse timings. A typical starting mode and a running mode can start at zero volts and ramp up to a desired speed at an appropriate voltage in a six-step running mode. One method is to first provide a calculated rotor angle based on a starting speed profile and a starting reference current $i_{qref}$, and then when the angle and speed observer is locked, to switch to the observer angle 405 and speed estimates 412 and start closed loop speed control of current $i_{qref}$ 409.

Challenges and Approaches for Six-Step Vector Control

The control modifications required to move from PWM scalar control to six-step scalar control are trivial as it is just a matter of changing the output switching method. The same is not true, however, for vector control. Practical application of six-step vector control methods to induction motors and permanent magnet motors presents several challenges, including:

Vector control operates on the basis of the drive being capable of quickly and accurately adjusting the magnitude and phase of its output voltages. This is possible for PWM methods which typically run at frequencies of a few kHz but is problematic for six-step methods which run at the motor electrical frequency on the order of 100 Hz for oilfield applications. Loss of control, over-current trips and motor stall are potential problems;

Current high-frequency harmonics (ripple) arising from six-step voltages;

Current low-frequency harmonics arising from six-step voltage volt-second imbalances (i.e. positive and negative output voltage pulses of slightly different width);

Current imbalance arising from six-step harmonics and possible imbalanced load;

Distortion of the voltages generated by the drive due to the effect of the above on the drive current controllers;

For sensorless vector control, the need for observers that are immune to the above voltage and current distortions; and the Need for a starting procedure and for a method to transition to normal running.

With particular reference to PMMs operating with six-step voltages, the following approaches have been proposed:

A. Vector control without any compensation for current distortion as disclosed in U.S. Pat. No. 10,044,306B2 and US20180254728A1 is a method of vector six step control that builds on FIG. 4 by calculating vector $v_{dq}$ in polar coordinates of magnitude and angle, the latter with the inverse tangent function on the components $v_d$ 413, and $v_q$ 414. The well-known fixed relationship of the magnitude of the phase voltage to the bus voltage of $2/\pi$ for six-step is used to directly set the converter bus voltage. There is no modulator as the angle, added to rotor angle $\theta$, is used to switch the voltage at predetermined values. This angle will be subject to significant jitter as the basic vector controller using square wave phase voltages will have substantial ripple as will be disclosed below.

B. Vector control including different methods of compensation for the current distortions, so that they do not affect the operation of the drive current controllers: The above method (A) is a basic approach, which does not consider the harmonic issues arising from six-step operation. In the effort to compensate for these effects, different methods have been proposed, which typically aim to generate better approximations to sinusoidal currents from the distorted six-step currents before passing them (as feedback) to the dq current PI controllers 406, 408 in FIG. 4. This is achieved by low-pass filtering, ripple estimation and subtraction, or main ripple harmonic estimation. The aforementioned methods focus on the implications of the high-frequency current harmonics, while other studies highlight and attempt to overcome the problem of low-frequency current harmonics.

C. Scalar (constant V/f) control: This is the traditional approach for driving an induction motor, either using PWM or six-step voltages. When applied to PMMs, however, it presents known challenges which relate to the motor current magnitude and system stability. For certain types of load, it is necessary to add current-minimising and stabilising loops to the motor controller. But even then, the method's dynamic response to significant load changes is poor, resulting in high motor currents and possible loss of synchronism.

D. Voltage angle control: This method is typically used for field-weakening, when maximum speed is reached with fixed bus voltage. The voltage switching angle is then varied to weaken the field and allow higher speed at the same fundamental voltage. Field weakening produces constant power as the speed increases and is not normally applicable to submersible pumping where the power requirement increases as speed increases. However, if the bus voltage can be varied, an additional controller must be added to adjust it based on the demanded speed, while the angle can be kept at the optimum for torque as disclosed in some of the references set forth herein after.

Problems and Needs in the Oil & Gas Industry

There are many thousands of older scalar six-step drives in use in the oil field used with IMs and scalar control. The additional motor heating caused by harmonic distortion is accepted in exchange for a lower cost product. The very long cables connecting the drive to the downhole motor result in voltage reflections every time the drive output voltages are switched. PWM drives by their nature have a rapid rate of switching and the reflections compounded across three phases can result in peak voltage amplitudes in the cable, connections and attached equipment that are multiples of the motor voltage rating and so can be damaging. Insulation degradation is accelerated by the much higher number of PWM pulses compared to the six-step pulse rate. The normal mitigation for PWM is to employ a low-pass ("sine-wave") filter at the drive output that filters the switch pulses leaving only the fundamental voltage component to be presented to the attached equipment. Such filters, particularly when implemented as add-ons, can be expensive.

An ESP operator with an inventory of six-step drives faces large capital costs to switch to newer drive technology needed to ensure reliable operation of permanent magnet motors. Hence, there is a need for a method and apparatus to convert and control six-step drives in a way that enables vector control of permanent magnet motors in the aforementioned special conditions that pertain to the submersible pumping industry, with reliable starting and resilience to transient loads. This will lower the capital costs of introducing new motor technology in the oilfield, albeit with some loss of performance compared to a PWM drive.

Such a method may have broader application such as electric vehicles operating at maximum voltage output in field weakening mode, or to achieve higher efficiency with variable bus voltage derived for example from a battery. Higher efficiency is obtained in an inverter when operating in six-step as compared to PWM mode due to the radical reduction of the switching losses. The method may also provide a solution for very high speed and very high power motors, where PWM drives may not be feasible due to the high power losses in the inverter switching semiconductors.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for controlling a motor. The system also includes a converter controller which may include a modulation index calculator configured to receive a vector voltage magnitude and a measured bus voltage and to output a calculated modulation index and at least one digital controller configured to receive any of the calculated modulation index, a modulation index reference, a reference bus voltage, a measured bus voltage, a modulation index error, and a bus voltage error and to output at least one bus voltage demand signal. The system also includes a converter configured to receive the at least one bus voltage demand signal and to output a controlled bus voltage. Other embodiments of this aspect include corresponding computer systems, apparatus, and computer programs recorded on one or more computer storage devices, each configured to perform the actions of the methods.

Implementations may include one or more of the following features. The system where the vector voltage magnitude is determined from a three phase measured voltage, the system may include an observer adapted to receive the three phase measured voltage and a three phase measured current and is further adapted to produce a rotor angle and an estimated speed. The system may include an adaptive band-pass filter adapted to receive the estimated speed and the three phase measured voltage and is further adapted to produce a positive sequence current to the converter controller. The adaptive band-pass filter may include a DSOGI. The observer may include a SOGI observer and is further adapted to produce a positive sequence current to the converter controller. The SOGI observer may include an mSOGI-2QSG PLL. The SOGI observer is further adapted to produce a negative sequence current to the converter controller. The converter controller may include a negative sequence controller adapted to receive the negative sequence current and a positive sequence controller adapted to receive the positive sequence current. The negative sequence controller produces a negative sequence voltage and the positive sequence controller produces a positive sequence voltage, the system may include a summation calculator adapted to receive the positive sequence voltage and the negative sequence voltage and is further adapted to produce a demanded voltage and where the demanded voltage is communicated to a modulator. The at least one digital controller is configured to switch between the modulation index error and the bus voltage error based on a threshold of the calculated modulation index. The at least one digital controller may include a modulation index digital controller configured to receive the calculated modulation index and a modulation index reference and to output a first bus voltage demand, and a voltage digital controller configured to receive the reference bus voltage and the measured bus voltage and to output a second bus voltage demand. The system may include a maximum value calculator configured to receive the first bus voltage demand the second bus voltage demand to output a selected bus voltage demand signal. Implementations of the described techniques may include hardware, a method or process, or computer software on a computer-accessible medium.

One general aspect includes a method of controlling a motor employing an electric drive. The method also includes providing a bus reference voltage at a low bus voltage level. The method also includes determining a measured bus voltage and controlling a controlled bus voltage demand in dependence with the measured bus voltage and the reference bus voltage, operating a modulator of the electric drive in dependence on the controlled bus voltage demand thereby producing a voltage waveform. The method also includes supplying the voltage waveform to the motor. Other embodiments of this aspect include corresponding computer systems, apparatus, and computer programs recorded on one or more computer storage devices, each configured to perform the actions of the methods.

Implementations may include one or more of the following features. The method where in the voltage waveform is any of a pulse width modulated waveform and a six-step waveform. The method may include determining a rotor angle based on any of an encoder, a starting speed profile and an observer and supplying the rotor angle to the electric drive. The method may include determining a reference current $i_{qref}$ and a direct reference current $i_{dref}$ and supplying the $i_{qref}$ and the $i_{dref}$ to the electric drive and determining a direct voltage $v_d$ and a quadrature voltage $v_q$ and calculating a vector voltage magnitude v and determining a calculated modulation index using a reference modulation index and the vector voltage magnitude v and determining a measured bus voltage and a reference bus voltage and controlling the controlled bus voltage demand in dependence with any of the calculated modulation index, the reference modulation index, the measured bus voltage and the reference bus voltage thereby producing a controlled bus voltage demand operating the modulator of the electric drive in further dependence on the $i_{qref}$ the $i_{dref}$ the $v_d$ and the $v_q$ and thereby producing the six-step waveform and supplying the six-step waveform to the motor. The method may include operating the observer in dependence on a parameter related to a three phase measured voltage $v_{abc.meas}$ and a three phase measured current $i_{abc.meas}$ thereby determining the rotor angle and an estimated speed of the motor. The method may include operating a DSOGI in dependence of the estimated speed and the three phase measured current $i_{abc.meas}$ and producing at least one of a positive sequence current $i_{abc+}$ a negative sequence current $i_{abc-}$ and supplying the at least one of the $i_{abc+}$ and the $i_{abc-}$ to the electric drive. The electric drive may include a positive sequence controller, the method may include operating the DSOGI in dependence of the estimated speed and the three phase measured current $i_{abc.meas}$ and supplying the $i_{abc+}$ to the positive sequence controller and operating the positive sequence controller in dependence of the rotor angle, the $i_{qref}$ the $i_{dref}$ and the $i_{abc+}$ and producing a positive sequence voltage and operating the modulator in dependence of the positive sequence voltage thereby producing the six-step waveform and supplying the six-step waveform to the motor. The electric drive may include a negative sequence controller, the method may include operating the DSOGI in dependence of the estimated speed and the three phase measured current $i_{abc.meas}$ and supplying the negative sequence current $i_{abc-}$ to the negative sequence controller and operating the negative sequence controller in dependence of a negative of the rotor angle, a zero value of the $i_{qref}$ and a zero value of the idref, and the negative sequence current $i_{abc-}$ and producing a negative sequence voltage and operating the modulator in dependence of the negative sequence voltage and the positive sequence voltage thereby producing the six-step waveform and supplying the six-step waveform to the motor. The electric drive may include a positive sequence controller and a negative sequence controller, the method may include operating the negative sequence controller in dependence of a negative of the rotor angle, a zero value of the $i_{qref}$ and a zero value of the $i_{dref}$ and the negative sequence current $i_{abc-}$ and producing a negative sequence voltage and operating the positive sequence controller in dependence of the rotor angle, the $i_{qref}$ and the $i_{dref}$ and the $i_{abc+}$ and producing a positive sequence voltage and operating the modulator in dependence of a summing of the negative sequence voltage and the positive sequence voltage thereby producing the six-step waveform and supplying the six-step waveform to the motor. The observer may include a SOGI observer, may include operating the SOGI observer in dependence of on a parameter related to a three phase measured voltage $v_{abc.meas}$ and the three phase measured current $i_{abc.meas}$ and producing a positive sequence current $i_{abc+}$ and supplying the $i_{abc+}$ to the electric drive. The electric drive may include a positive sequence controller and a negative sequence controller, the method may include operating the SOGI observer in dependence of the parameter related to a three phase measured voltage $v_{abc.meas}$ and the three phase measured current $i_{abc.meas}$ and producing a negative sequence current $i_{abc-}$ supplying the $i_{abc+}$ to the positive sequence controller and the $i_{abc-}$ to the negative sequence controller and operating the negative sequence controller in dependence of a negative of the rotor angle, a zero value of the $i_{qref}$ and a zero value of the $i_{dref}$, and the $i_{abc-}$ and producing a negative sequence voltage and operating the positive sequence controller in dependence of the rotor angle, the $i_{qref}$ and the $i_{dref}$, and the $i_{abc+}$ and producing a positive sequence voltage and operating the modulator in dependence of a summing of the negative sequence voltage and the positive sequence voltage thereby producing the six-step waveform and supplying the six-step waveform to the motor. The determining of the $i_{qref}$ is in dependence of the estimated speed of the motor and a speed reference. The method may include reverting back to the low bus voltage level. Implementations of the described techniques may include hardware, a method or process, or computer software on a computer-accessible medium.

One general aspect includes a downhole pumping system that includes a pump and a motor configured to operate the pump and a variable speed drive including a converter controller may include a modulation index calculator configured to receive a vector voltage magnitude and a measured bus voltage and to output a calculated modulation index and at least one digital controller configured to receive any of the calculated modulation index, a modulation index reference, a reference bus voltage, a measured bus voltage, a modulation index error, and a bus voltage error and to output at least one bus voltage demand signal and a converter configured to receive the at least one bus voltage demand signal and to output a controlled bus voltage. The system also includes where the variable speed drive is configured to control the operation of the motor based at least in part on the controlled bus voltage. Other embodiments of this aspect include corresponding computer systems, apparatus, and computer programs recorded on one or more computer storage devices, each configured to perform the actions of the methods.

Implementations may include one or more of the following features. The downhole pumping system where the vector voltage magnitude is determined from a three phase measured voltage, the downhole pumping system may include an observer adapted to receive the three phase measured voltage and a three phase measured current and is further adapted to produce a rotor angle and an estimated speed. The downhole pumping system may include an adaptive band-pass filter adapted to receive the estimated speed and the three phase measured voltage and is further adapted to produce a positive sequence current to the converter controller. The adaptive band-pass filter may include a DSOGI. The observer may include a SOGI observer and is further adapted to produce a positive sequence current to the converter controller. The SOGI observer may include an mSOGI-2QSG PLL. The SOGI observer is further adapted to produce a negative sequence current to the converter controller. The converter controller may include a negative sequence controller adapted to receive the negative sequence current and a positive sequence controller adapted to receive the positive sequence current. The negative sequence controller produces a negative sequence voltage and the positive sequence controller produces a positive sequence voltage, the downhole pumping system may include a summation calculator adapted to receive the positive sequence voltage and the negative sequence voltage and is further adapted to produce a demanded voltage and where the demanded voltage is communicated to a modulator. The at least one digital controller is configured to switch between the modulation index error and the bus voltage error based on a threshold of the calculated modulation index. The at least one digital controller may include a modulation index digital controller configured to receive the calculated modulation index and a modulation index reference and to output a first bus voltage demand, and a voltage digital controller configured to receive the reference bus voltage and the measured bus voltage and to output a second bus voltage demand. The downhole pumping system may include a maximum value calculator configured to receive the first bus voltage demand the second bus voltage demand to output a selected bus voltage demand signal. Implementations of the described techniques may include hardware, a method or process, or computer software on a computer-accessible medium.

Another general aspect includes a method of controlling a motor using an electric drive. The method also includes providing a bus voltage. The method also includes providing a reference modulation index $M_{ref}$ for a six-step running mode. The method also includes selecting a starting mode from any of a PWM starting mode or a six-step starting mode. The method also includes starting the motor in the starting mode at a low bus voltage level. The method also includes increasing a motor speed using the starting mode. The method also includes adjusting the motor speed by regulating the bus voltage to maintain a measured modulation index m substantially equal to $M_{ref}$ in the six-step running mode. Other embodiments of this aspect include corresponding computer systems, apparatus, and computer programs recorded on one or more computer storage devices, each configured to perform the actions of the methods.

The method may include determining a rotor angle based on any of an encoder, a starting speed profile and an observer and supplying the rotor angle to the electric drive. The method may include operating the observer in dependence on a parameter related to a three phase measured voltage $v_{abc.meas}$ and a three phase measured current $i_{abc.meas}$ thereby determining the rotor angle and an estimated speed of the motor. The method may include operating a SOGI in dependence of the estimated speed and the three phase measured current $i_{abc.meas}$ and producing at least one of a positive sequence current $i_{abc+}$ and a negative sequence current $i_{abc-}$ and supplying the at least one of the positive sequence current $i_{abc+}$ and the negative sequence current $i_{abc-}$ to the electric drive. The electric drive may include a positive sequence controller, the method may include operating the SOGI in dependence of the estimated speed and the three phase measured current $i_{abc.meas}$ and supplying the positive sequence current $i_{abc+}$ to the positive sequence controller and operating the positive sequence controller in dependence of the rotor angle, a reference current $i_{qref}$ and a direct reference current $i_{dref}$ and the positive sequence current $i_{abc+}$ and producing a positive sequence voltage and operating a modulator in dependence of the positive sequence voltage thereby producing a six-step waveform and supplying the six-step waveform to the motor. The electric drive may include a positive sequence controller and a negative sequence controller, the method may include operating the negative sequence controller in dependence of a negative of the rotor angle, a zero value of the $i_{qref}$ and a zero value of the $i_{dref}$ and the negative sequence current $i_{abc-}$ and producing a negative sequence voltage and operating the positive sequence controller in dependence of the rotor angle, the $i_{qref}$ and the $i_{dref}$, and the positive sequence current $i_{abc+}$ and producing a positive sequence voltage and operating the modulator in dependence of a summing of the negative sequence voltage and the positive sequence voltage thereby producing the six-step waveform and supplying the six-step waveform to the motor. The method may include a SOGI observer and the electric drive may include a positive sequence controller, the method may include operating the SOGI observer in dependence of a parameter related to a three phase measured voltage $v_{abc.meas}$ and the three phase measured current $i_{abc.meas}$ and producing a positive sequence current $i_{abc+}$ and supplying the positive sequence current $i_{abc+}$ to the positive sequence controller and operating the positive sequence controller in dependence of the rotor angle, a reference current $i_{qref}$ and a direct reference current $i_{dref}$, and the positive sequence current $i_{abc+}$ and producing a positive sequence voltage and operating a modulator in dependence of the positive sequence voltage thereby producing a six-step waveform and supplying the six-step waveform to the motor. The electric drive may include a positive sequence controller and a negative sequence controller, the method may include operating the SOGI in dependence of the parameter related to a three phase measured voltage $v_{abc.meas}$ and the three phase measured current $i_{abc.meas}$ and producing a negative sequence current $i_{abc-}$ and supplying the positive sequence current $i_{abc+}$ to the positive sequence controller and the negative sequence current $i_{abc-}$ to the negative sequence controller and operating the negative sequence controller in dependence of a negative of the rotor angle, a zero value of the reference current $i_{qref}$ and a zero value of the direct reference current $i_{dref}$, and the negative sequence current $i_{abc-}$ and producing a negative sequence voltage and operating the positive sequence controller in dependence of the rotor angle, the reference current $i_{qref}$ and the direct reference current $i_{dref}$, and the positive sequence current $i_{abc+}$ and producing a positive sequence voltage and operating a modulator in dependence of a summing of the negative sequence voltage and the positive sequence voltage thereby producing a six-step waveform and supplying the six-step waveform to the motor. Implementations of the described techniques may include hardware, a method or process, or computer software on a computer-accessible medium.

One general aspect includes a method of controlling a motor using an electric drive. The method also includes providing a starting mode and a six-step running mode and starting the motor in the starting mode, operating the motor in the six-step running mode, determining a rotor angle and a speed of the motor, operating a SOGI in dependence of at least one of the speed and a three phase measured current $i_{abc.meas}$ and producing at least one of a positive sequence current $i_{abc+}$ and a negative sequence current $i_{abc-}$ and supplying the at least one of the positive sequence current $i_{abc+}$ and the negative sequence current $i_{abc-}$ to the electric drive. Other embodiments of this aspect include corresponding computer systems, apparatus, and computer programs recorded on one or more computer storage devices, each configured to perform the actions of the methods.

Implementations may include one or more of the following features. The method where the electric drive may include a positive sequence controller, the method may include supplying the positive sequence current $i_{abc+}$ to the positive sequence controller and operating the positive sequence controller in dependence of the rotor angle, a reference current $i_{qref}$ and a direct reference current $i_{dref}$, and the positive sequence current $i_{abc+}$ and producing a positive sequence voltage and operating a modulator in dependence of the positive sequence voltage thereby producing a six-step waveform and supplying the six-step waveform to the motor. The electric drive may include a negative sequence controller, the method may include operating the SOGI in dependence of the speed and the three phase measured current $i_{abc.meas}$ and supplying the negative sequence current $i_{abc-}$ to the negative sequence controller and operating the negative sequence controller in dependence of a negative of the rotor angle, a zero value of the $i_{qref}$ and a zero value of the $i_{dref}$, and the negative sequence current $i_{abc-}$ and producing a negative sequence voltage and operating a modulator in dependence of the negative sequence voltage and the positive sequence voltage thereby producing the six-step waveform and supplying the six-step waveform to the motor. The method may include selecting the starting mode from any of a PWM starting mode or a six-step starting mode, providing a bus voltage, providing a reference modulation index $M_{ref}$ for the six-step running mode, starting the motor in the starting mode at a low bus voltage level, increasing a motor speed using the starting mode, and adjusting the motor speed by regulating the bus voltage to maintain a measured modulation index m substantially equal to $M_{ref}$ in the six-step running mode. The starting mode is the PWM starting mode, the method may include monitoring a measured modulation index m while in the PWM starting mode and providing a maximum modulation index $M_{max}$ and switching to the six-step running mode when m is substantially equal to $M_{max}$. The method may include a SOGI observer and the electric drive may include a positive sequence controller, the method may include operating the SOGI observer in dependence of on a parameter related to a three phase measured voltage $v_{abc.meas}$ and the three phase measured current $i_{abc.meas}$ and producing a positive sequence current $i_{abc+}$ and supplying the positive sequence current $i_{abc+}$ to the positive sequence operating the positive sequence controller in dependence of the rotor angle, a reference current $i_{qref}$ and a direct reference current $i_{dref}$, and the positive sequence current $i_{abc+}$ and producing a positive sequence voltage and operating a modulator in dependence of the positive sequence voltage thereby producing a six-step waveform and supplying the six-step waveform to the motor. The electric drive may include a positive sequence controller and a negative sequence controller, the method may include operating the SOGI observer in dependence of the parameter related to a three phase measured voltage $v_{abc.meas}$ and the three phase measured current $i_{abc.meas}$ and producing a negative sequence current $i_{abc-}$ and supplying the positive sequence current $i_{abc+}$ to the positive sequence controller and the negative sequence current $i_{abc-}$ to the negative sequence controller and operating the negative sequence controller in dependence of a negative of the rotor angle, a zero value of the $i_{qref}$ and a zero value of the $i_{dref}$ and the negative sequence current $i_{abc-}$ and producing a negative sequence voltage and operating the positive sequence controller in dependence of the rotor angle, the $i_{qref}$ and the $i_{dref}$, and the positive sequence current $i_{abc+}$ and producing a positive sequence voltage and operating a modulator in dependence of a summing of the negative sequence voltage and the positive sequence voltage thereby producing the six-step waveform and supplying the six-step waveform to the motor. The method may include selecting the starting mode from any of a PWM starting mode or a six-step starting mode, providing a bus voltage, providing a reference modulation index $M_{ref}$ for the six-step running mode, starting the motor in the starting mode at a low bus voltage level, increasing a motor speed using the starting mode, and adjusting the motor speed by regulating the bus voltage to maintain a measured modulation index m substantially equal to $M_{ref}$ in the six-step running mode. The starting mode is the PWM starting mode, the method may include monitoring a measured modulation index m while in the PWM starting mode and providing a maximum modulation index $M_{max}$ and switching to the six-step running mode when m is substantially equal to $M_{max}$. Implementations of the described techniques may include hardware, a method or process, or computer software on a computer-accessible medium.

BRIEF DESCRIPTION OF THE DRAWINGS

So that the manner in which the above-recited features of the present disclosure can be understood in detail, a more particular description of the disclosure, briefly summarized above, can be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following detailed description of the embodiments, reference is made to the accompanying drawings, which form a part hereof, and within which are shown by way of illustration specific embodiments by which the examples described herein can be practiced. It is to be understood that other embodiments can be utilized, and structural changes can be made without departing from the scope of the disclosure.

Embodiments of the present disclosure address all the prior art problems of vector six step control listed hereinabove as is now disclosed.

Starting Using Pulse Width Modulation

Starting is a critical phase of operation. In reference to submersible pumping applications (FIG. 1), the initial starting current may need to be high enough to free a stuck pump 12, but the voltage drop in the long cable 15 and motor resistance combined with low speed (low electrical frequency) can raise the ratio of surface voltage to a frequency above the level that will saturate the transformer 23. The motor 10 should be operated at its maximum torque to current ratio, to minimise current. Motor current and torque ripples due to harmonic currents should also preferably be minimised.

Figure 1:
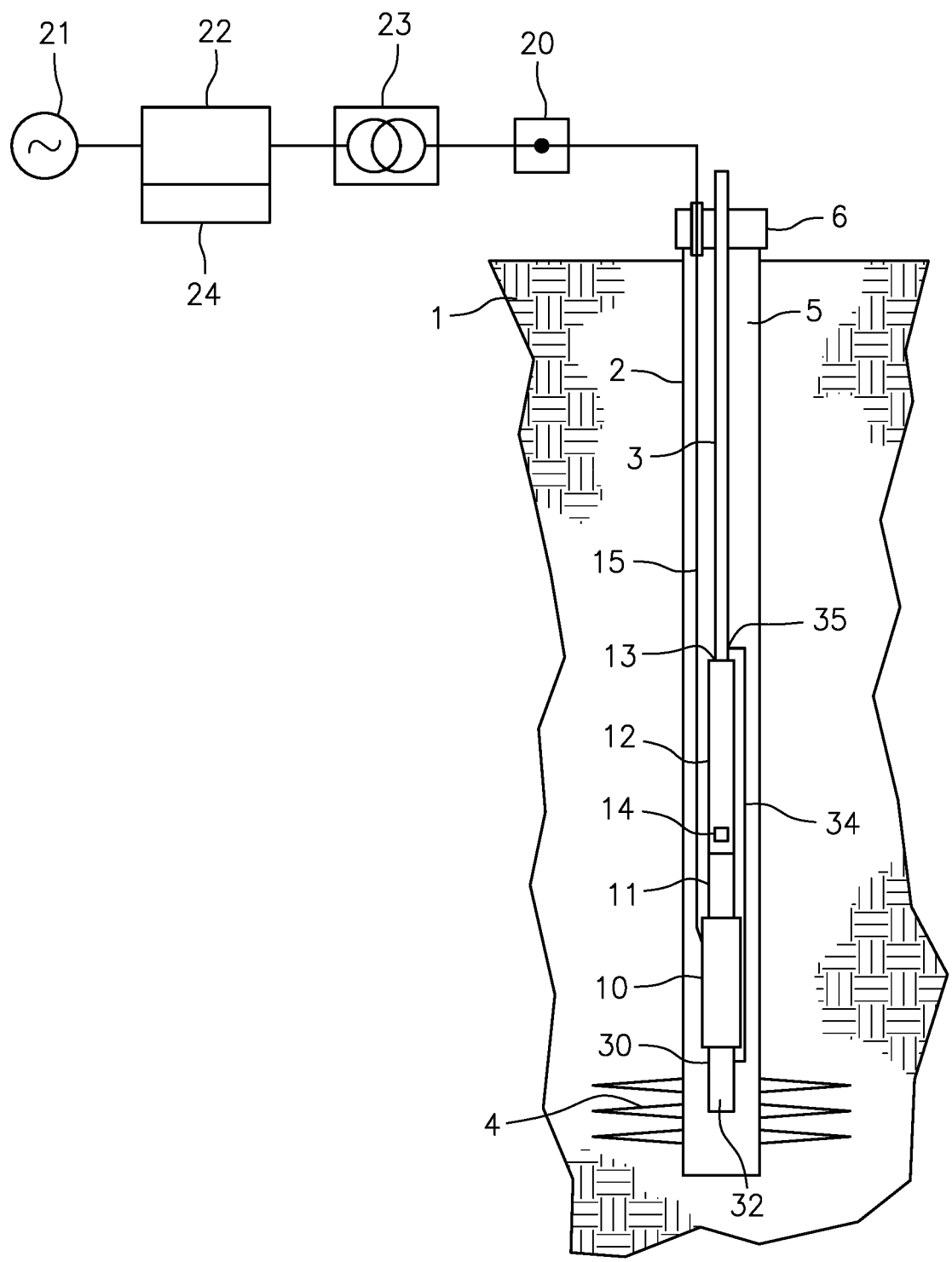
FIG. 1 is an illustration of a submersible pump installation of the prior art.
Figure 2:
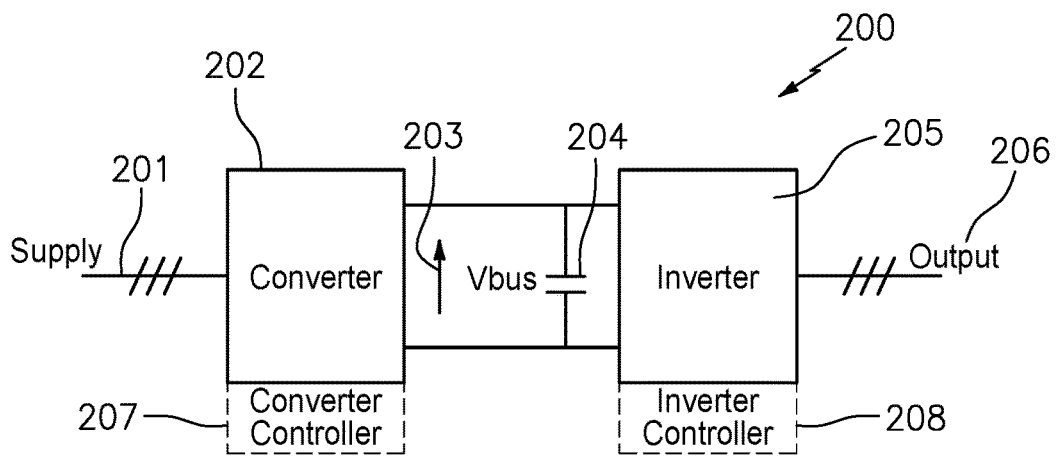
FIG. 2 is a schematic diagram of a basic motor drive system of the prior art.
Figure 3:
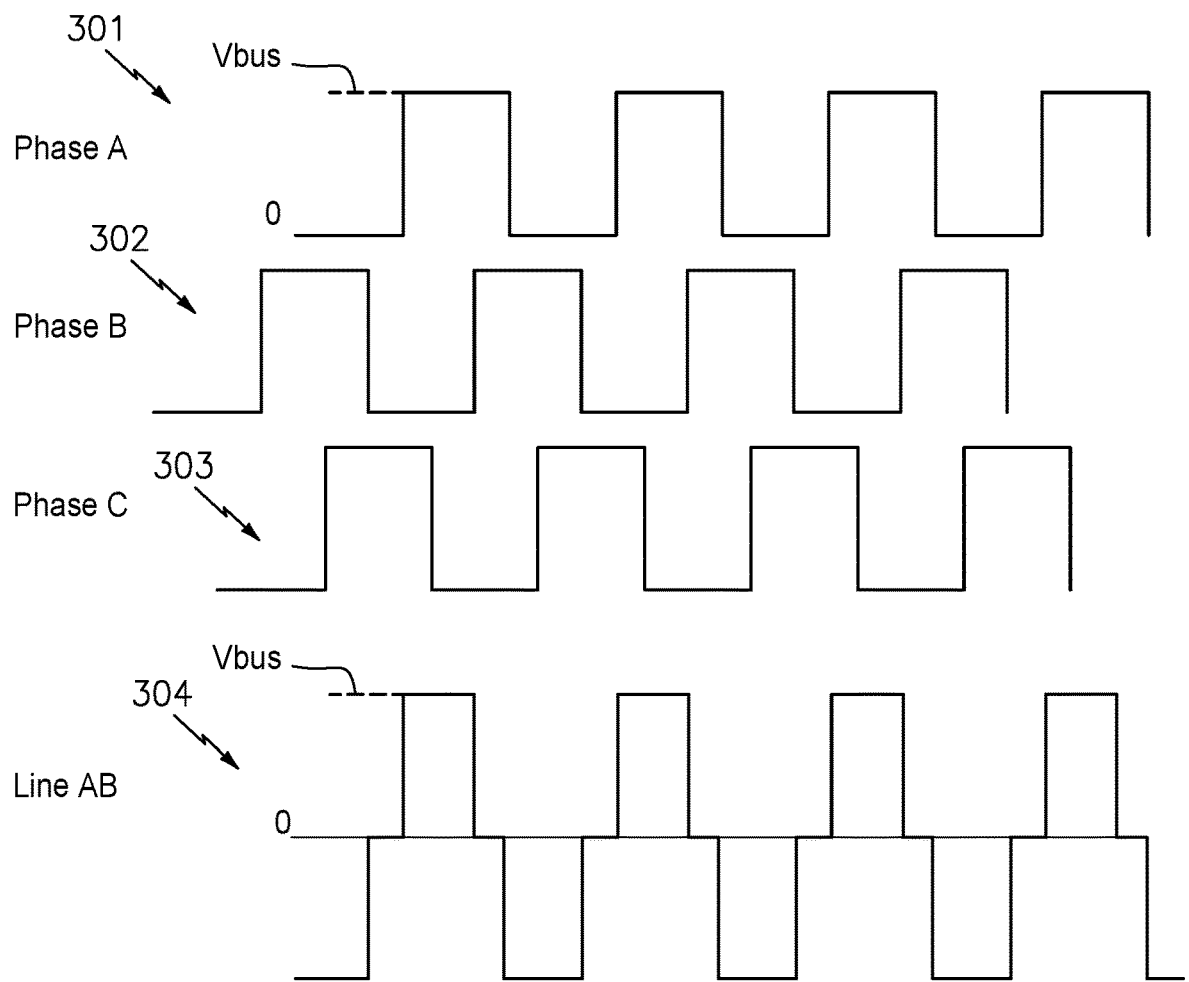
FIG. 3 is a schematic diagram of the three phase voltages and a line voltage generated by a six step control of the prior art.

These and other factors can be addressed by using sinusoidal motor current. With reference to FIGS. 1 and 2, It has been discovered that in a drive 22 intended for six-step operation, the drive bus voltage 203 can be set to a low level, whereby safe starting of motor 10 is possible using PWM without a sine filter to suppress voltage reflections on the cable 15. It should be noted that implementations of the described techniques may include hardware, a method or process, or computer software on a computer-accessible medium.

For example, suppose the drive 22 has a supply voltage 201 of 480 Vrms and the motor 10 operates at full speed and load at 3,600 rpm with 3,000 Vrms. A typical insulation rating for the system parts for this application such as motor windings, cable and transformer, would be 3000-5000 Vrms. The fully charged bus voltage 203 will be approximately 650V, the six-step fundamental line voltage will be approximately 500 Vrms and hence the transformer step-up ratio will be 3,000/500=6:1. This means that each six step pulse will switch 650V×6=3,900V peak voltage to the motor, which can result in cable voltage reflection pulses of 8,000-10,000V peak. These extremely high voltage short duration pulses have to be withstood by the ratings of the system parts. For six step control they occur only at the motor fundamental frequency, 60 Hz for a two-pole motor and insulation life under these conditions has been found to be satisfactory. If PWM were to be used, the reflections might occur several thousand times per second, which as is known, is likely to cause damage through accumulation of these cycles of pulses and is therefore avoided in the prior art or low pass power filters are used. It has been discovered however that, during starting, if the bus voltage 203 is established at an acceptable low level, given a predetermined switching frequency, the above described damage to the system parts is avoided using unfiltered PWM techniques. For example, if the maximum speed of motor 10 during the starting phase is 600 rpm, then the bus voltage 203 would need to be only about 600/3600×650=108V. The six-step pulses seen by the motor would be 648 Vpeak and the reflections would be 1300-1900V peak, which is perfectly acceptable for medium voltage motors. As used herein, a low bus voltage level 601 means a bus voltage level that is low enough that peak voltages from reflections at the PWM switching frequency are within the insulation ratings of the system parts connected to the drive output, including motor windings, cable and transformer to avoid the problems described immediately herein above.

As a further measure, embodiments of the present disclosure include methods where the PWM switching rate can be reduced to a low predetermined value compared to normal PWM switching, since during starting the speed of motor 10 is relatively low compared to its normal running speed. A four-pole motor 10 at 600 rpm has an electrical frequency of 20 Hz, so even 500 Hz switching rate would give 25 PWM pulses per cycle, adequate to generate high quality sinusoidal motor current. This further reduces accumulated damage due to reflections as the pulse rate is low or alternatively permits an increase an increase the low bus voltage described herein above. Similar to the low bus voltage method described above, a low switching rate (frequency) as used herein means low enough to avoid problems with the insulation ratings of the system parts connected to the drive output, including motor windings, cable and transformer as described immediately herein above.

Referring again to FIG. 4, the typical starting procedure of a vector controller 400 as described herein above includes steps of first selecting rotor angle 405 as a calculated value increasing with time, corresponding to a predetermined starting speed profile, and reference current $i_{qref}$ 409 as a starting current. When the observer locks, rotor angle 405 is selected as the observer estimated angle, and reference current $i_{qref}$ 409 may be selected as the output of a speed controller 410 whose inputs are the observer estimated speed 412 and a selected speed reference 411. These steps require that the vector controller 400 demanded voltages $v_{abc}$ 416 are actually achieved as drive output voltages 206 by the inverter 205 (FIG. 2), which in turn requires that there is sufficient bus voltage $v_{bus}$ 203 available at all times.

Figure 6:
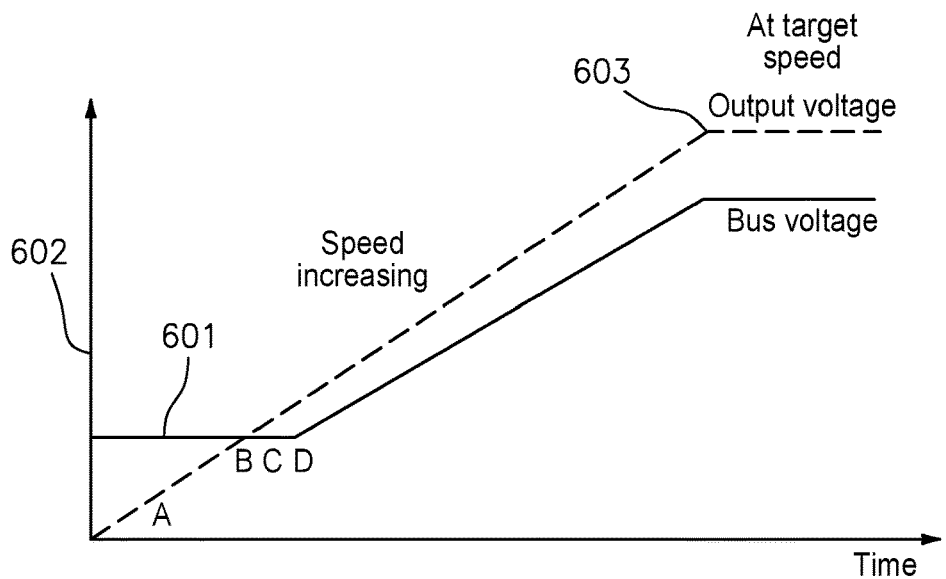
FIG. 6 is a graphical representation of modulation controlled bus voltage and output voltage in accordance with certain embodiments of the present disclosure.

Embodiments of the present disclosure ensure that sufficient bus voltage 203 is available at all times as is now set forth. Referring again to FIG. 2, converter 202 is started at a predetermined low bus voltage, the low bus voltage level 601 (as shown in FIG. 6), and the modulator 417 (in FIG. 4) is set to use PWM preferably at a low switching rate. This provides the aforementioned benefits of PWM for starting while not causing damage to motor insulation. A suitable low voltage and a low switching rate may be determined as in the example above to be for example 100V and 500 Hz. The vector controller 400 action will be to increase the demanded voltage $v_{dq}$ 413, 414 as the speed of motor 10 increases. This disclosed vector control method for starting motor 10 with low bus voltage and low frequency PWM could also be applied to scalar control V/f starting. This however typically requires an initial voltage boost to overcome cable and motor resistance. The required voltage boost is difficult to determine and can easily lead to excessive starting current, so the preferred method for vector controlled drives is the one described hereinabove.

Transition to Six-Step Control and Bus Voltage Control Based on Modulation Index As hereinbefore explained, PWM pulse widths are varied to control both the shape and amplitude of the pulse-averaged voltage profile. The controller-demanded voltage $v_{dq}$ 413, 414 is related to the bus voltage 203 by a modulation index M. Different definitions may be given for M, but as referred to hereinbelow it will be assumed that a PWM drive 400 generates a voltage whose fundamental is proportional (linear) to the modulation index up to M=1, while it over-modulates for M>1. Most modern PWM drives will use different types of space vector modulation (SVPWM, SVM), or carrier-based methods such as third harmonic injection PWM (THIPWM) in which the peak fundamental voltage when M=1 is equal to the bus voltage. However other methods may be used, for example sine PWM for which the peak fundamental voltage is √3/2=0.87 times the bus voltage when M=1.

Figure 5A:
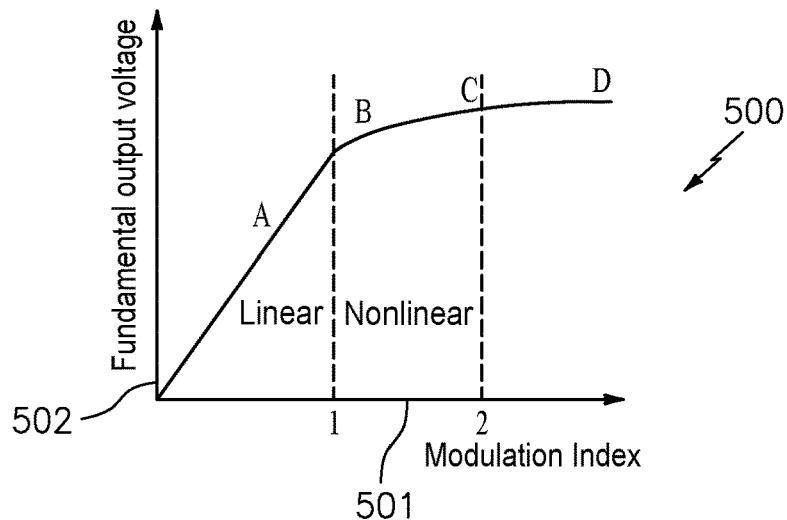
FIG. 5A is a graphical representation of the drive output fundamental voltage versus modulation index of the prior art.
Figure 5B:
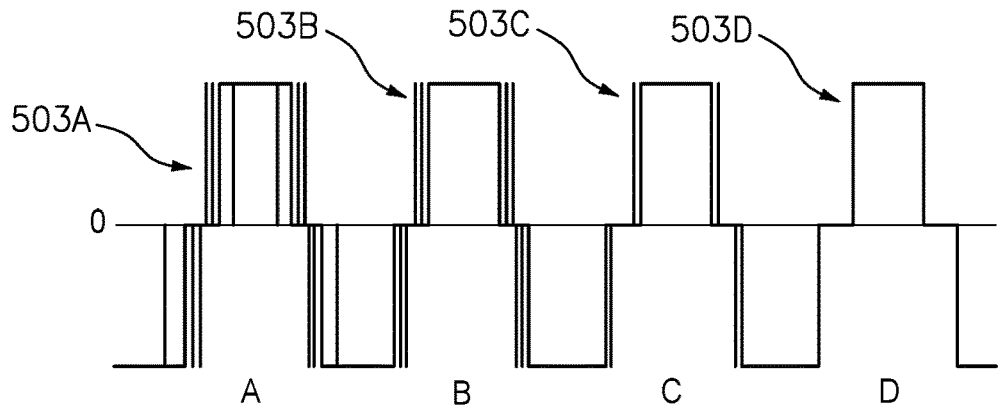
FIG. 5B is a schematic diagram illustrating the shape of a drive output line voltage resulting from pulse width modulation in the linear range, into over-modulation and finally to six step control of the prior art.

In reference to FIGS. 5A, 5B, as the modulation index 501 is plotted against the fundamental output voltage 502. As modulation index 501 increases above M=1 the fundamental output peak voltage increases much less rapidly, and approaches asymptotically to the six-step fundamental voltage limit D. Point A indicates normal PWM with many pulses per cycle; point B is beyond modulation index M=1 and shows the dropping of pulses 503A (as they reduce to zero width) compared to pulses 503B as more fundamental voltage is demanded, progressing to point C where perhaps only a few "splinter" pulses 503C remain and finally the asymptotic limit of six-step pulse 503D at point D.

Figure 7:
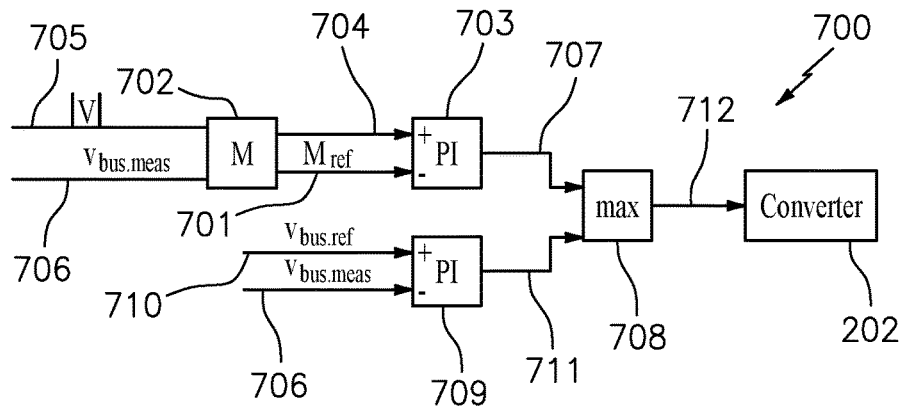
FIG. 7 is a schematic diagram of an embodiment of bus voltage controller in accordance with certain embodiments of the present disclosure.

In terms of modulation, during initial starting, as the speed of motor 10 increases, and due to the fact that the bus is started at a low bus voltage 203 for the reasons explained hereinabove, the modulation index 501 passes from the linear zone A until pulses 503A start dropping to the number of pulses 503B as the output voltage passes through point B. As the speed continues to increase, the vector controller will increase its dq voltage outputs 413, 414 and eventually, and with very high demanded voltage, will reach point D. However, it has been discovered that it can be sufficient to set a threshold, $M_{max}$, for the modulation index 501 in the area of point C, for example $M_{max}$=2, where the fundamental output voltage 502 is very close to D, and then switch the modulation to six step. Referring specifically to FIG. 5B this transition is shown between 503C and 503D. As soon as six-step operation is initiated, no further increase in speed can be achieved with this bus voltage. To continue the speed increase, and with reference to FIG. 6, the bus voltage 601 must be increased. With further reference to FIG. 7, the bus controller 700 can control the bus voltage by a regulator or digital controller such as upper modulation index PI controller 703, which adjusts the bus voltage 601 to hold the measured modulation index 704 at a reference modulation index value 701 of $M_{ref}$, where $M_{ref}=M_{max}$ in this example. As is known by those skilled in the art, the magnitude of the demanded voltage vector |v| 705, or vector voltage magnitude, is determined using the following relationship (or a known equivalent in another reference frame):

$$|v| = \sqrt{v_d^2 + v_q^2} \quad \text{(Equation 1)}$$

The calculated modulation index 704 uses modulation index calculator 702 block M dependent on the modulation scheme used. For space vector modulation a suitable calculation is:

$$M = \frac{\sqrt{3}\,|v|}{v_{bus,meas}} \quad \text{(Equation 2)}$$

The inputs and output of the calculator block may be filtered if desired. The values $M_{ref}$ and $M_{max}$ should be the same or similar, but the value $M_{max}$=2 is not critical and other predetermined threshold values may be chosen. However, high values require the current PI controllers 406, 408 (in FIG. 4) to be operated over a wider demanded voltage $v_{dq}$ 413, 414 amplitude range. Referring still to FIG. 7, the upper modulation index PI controller 703 accepts the modulation index reference $M_{ref}$ 701 and the calculated modulation index 704. Modulation index digital controller 703 uses the calculated modulation index 704 and the modulation index reference $M_{ref}$ 701 and outputs a modulation controller output signal 707 to the maximum value calculator 708. If the calculated modulation index 704 is lower than the modulation index reference $M_{ref}$ 701, the demand will be reduced and vice versa. In parallel with the modulation index PI controller 703 is a voltage PI controller 709 that attempts to regulate the bus voltage to the starting reference bus voltage level wherein this reference may be ramped from zero as part of starting. If the measured bus voltage 706 is lower than the bus reference voltage 710, the voltage digital controller 709 will produce a controlled bus voltage demand 711 that will be increased and vice versa. The controlled bus voltage demand 711 and the modulation controller output signal 707 are fed to a maximum value calculator 708, whose output is the selected bus voltage demand signal 712 output to converter 202. In operation, when the starting modulation is PWM and hence the calculated modulation index 704 is less than unity, the upper modulation index PI controller 703 will request a very low bus voltage 706 to try and increase the calculated modulation index 704 towards $M_{ref}$ 701 and the controlled bus voltage demand 711 will be selected by maximum value calculator 708. Conversely as the calculated modulation index 704 increases towards $M_{ref}$ 701 at the end of the initial phase A (FIG. 5), the modulation index PI controller 703 will demand a higher bus voltage, and the modulation controller output signal 707 will be selected by maximum value calculator 708.

With reference back to FIG. 6, there it is illustrated how the measured bus voltage 601 can be changed by the bus controller 700 as the speed of motor 10 is increased depicted by axis 602, until the target speed 603 is reached and the system stabilises.

Figure 8:
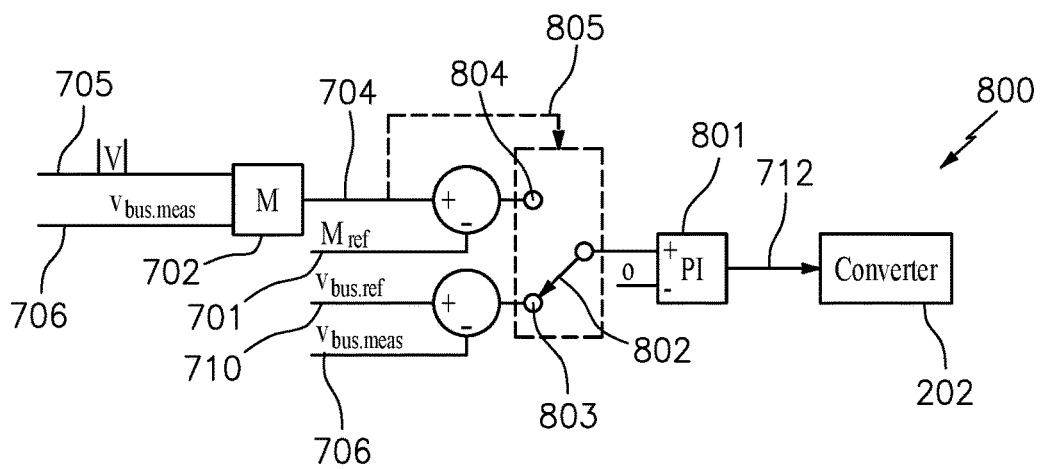
FIG. 8 is a schematic diagram of an embodiment of bus voltage controller in accordance with certain embodiments of the present disclosure.

FIG. 8 shows an alternative embodiment of the bus control 800 that uses just one PI regulator 801, with the error term switched by switch 802 between the bus voltage error 803 in the initial starting phase to the modulation index error 804 in the ramping phase. Once the switch is made, based on a predetermined threshold value of the modulation index, it is latched to prevent switching between modes due to noise.

Although the foregoing has been directed to a starting control mode, it is evident that the motor 10 can be slowed down and revert to PWM with low bus voltage 203 if very wide range of operation is required, rather than starting and running followed later by immediate stopping. Embodiments of the bus voltage and modulation control of the present disclosure serve to ensure that adequate bus voltage 203 is provided at all times to meet the requirements of the vector controller 400 demanded voltages $v_{abc}$ 416. It will be appreciated that the starting control mode and the running control mode of the vector or other control of the motor is independent of the bus voltage and the modulation method change of the predetermined voltage waveform from a pulse width modulated waveform to a six-step output waveform. The change from calculated rotor angle to observer angle and from calculated speed to controlled speed can occur when the bus voltage is at its starting value and PWM is used or when the bus voltage is increasing, and six-step modulation is used. For reliable starting it is preferred that the transition occurs while still using PWM and this can be ensured by selecting a suitable value of the starting bus voltage as described hereinabove.

Moreover, it should be appreciated that after the transition to six-step operation, the reference value $M_{ref}$ 701 can be slowly changed to a lower or higher value, without any effect on the method's operation.

It will also be apparent to one skilled in the art that six step operation could be used throughout the starting process. This can be by directly starting with six-step and regulating the bus voltage 203 based on $M_{ref}$ 701. Alternatively, by simply starting the converter 202 at sensibly zero bus voltage, the calculated modulation index 704 will immediately exceed any value set for $M_{ref}$ 701 (due to the division with the almost-zero bus voltage) and so, following the explanation hereinabove, six-step operation and bus voltage regulation will commence immediately. The advantages of PWM starting would however be lost. Simulations have shown that if dq current control of vector controller 400 is used with six-step voltages and is applied during starting, excessive ripple on bus voltage, output current and motor torque appear, which can reduce the chances of successful motor starting. Moreover, unless the demanded voltages are heavily filtered using an appropriate method, the generated voltages include several additional pulses per cycle which defeats the simple intent to use six-step voltages.

Although in embodiments FIG. 7 and FIG. 8 the regulator output is shown as a bus voltage demand signal 712 that is an input to a bus voltage converter 202. It will be appreciated that the converter only requires a signal that changes to request more or less voltage. For example, if the converter 202 in FIG. 2 is of controlled rectifier type, the signal could be used directly as the thyristor firing angle. If the converter 202 in FIG. 2 is of Buck or Boost DC-DC converter type, the signal could be the converter pulse duty cycle. It is therefore to be understood that the bus voltage demand signal is a term covering different implementations of a signal that varies to produce more or less bus voltage demand.

Figure 10:
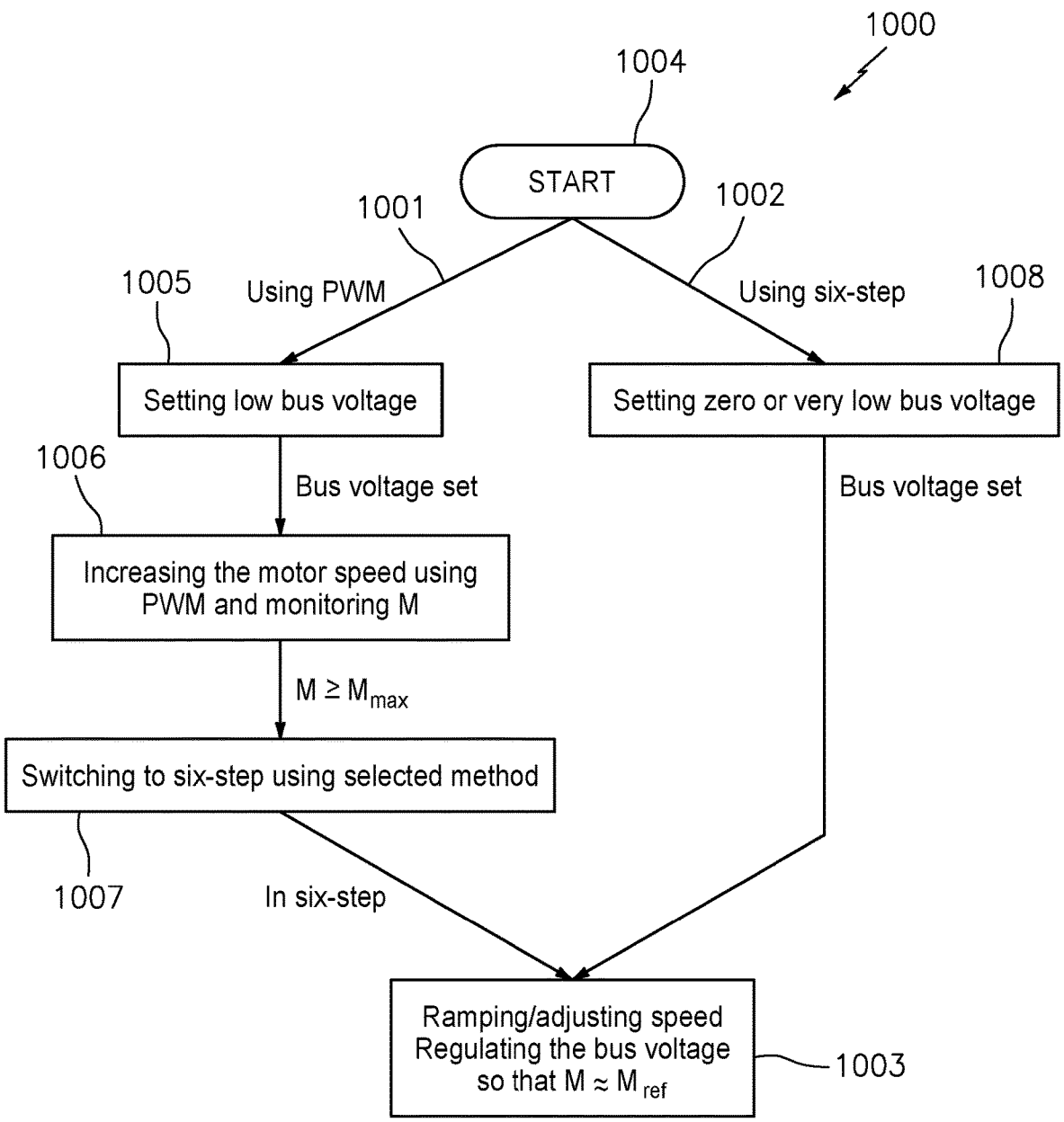
FIG. 10 is a state diagram of a control system in an embodiment of the present disclosure.

The state diagram 1000 in FIG. 10 illustrates the procedure for transitioning from PWM starting 1001 or six-step starting 1002 to bus voltage regulation state 1003 based on M and as described hereinabove in detail. At START 1004, if using PWM 1002, the bus voltage is set to the desired low bus voltage at state 1005. The vector controller 400 (FIG. 4) is set to use PWM and the speed of motor 10 (FIG. 1) is increased and monitoring M at state 1006. When M reaches $M_{max}$, the modulator changes to six-step output at state 1007. The bus voltage is then regulated to hold M substantially equal to $M_{ref}$ at bus voltage regulation state 1003 as the speed of motor 10 continues to increase to its predetermined running value, and as the motor speed is subsequently varied for operational reasons. If instead, at START, six-step is selected, the bus voltage is set to a zero value or a very low voltage at state 1008. The bus voltage is then regulated to hold $M=M_{ref}$ at bus voltage regulation state 1003 as the speed of motor 10 continues to increase to its predetermined running value, and as the speed is subsequently varied for operational reasons. In both cases regulation of M ensures the bus voltage will adjust to the value needed to support the required speed and load.

Methods for a Smooth Transition from PWM to Six Step

Figure 9:
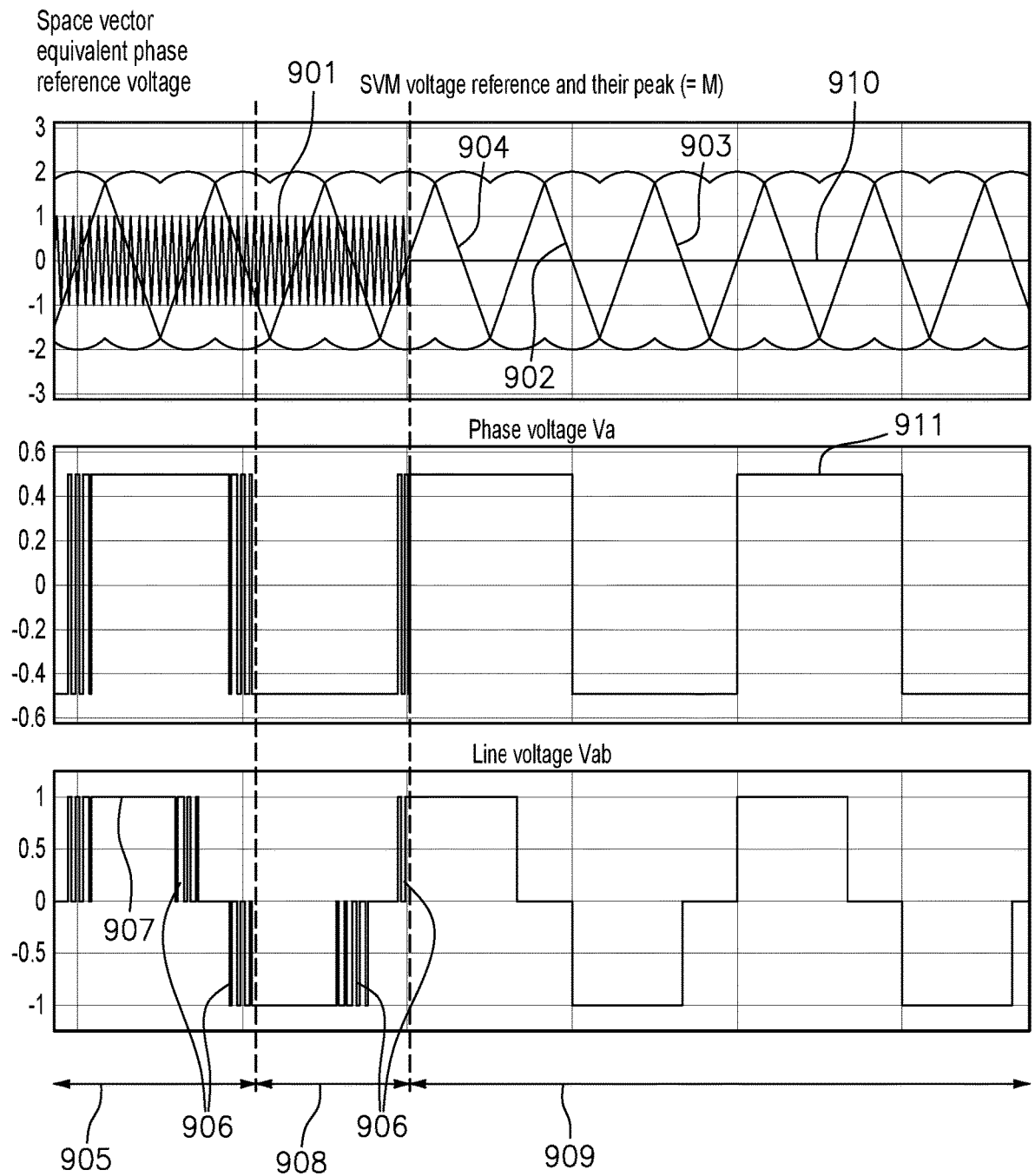
FIG. 9 is a graphical representation of the three phase reference and carrier signals of a control system in an embodiment of the present disclosure.

FIG. 9 shows a transition to six-step modulation for a particular embodiment of the present disclosure. For clarity, the bus voltage is drawn normalised to unit amplitude. A known triangle carrier 901 is used. The phase voltage references $v_{abc}$ 902, 903, 904 are modified from sine waves to space vector equivalent form, which as is known is achieved with the addition of a common-mode signal to increase the fundamental content with a given peak amplitude, and for clarity are scaled to be consistent with the normalised bus voltage. The line voltage seen at the motor terminals is the difference between two phase voltages, in which the common-mode signal is cancelled out.

According to the method disclosed herein, the modulation index is representatively controlled at $M_{max}=M_{ref}=2$. Late stage starting mode 905 includes carrier 901 and output contains a plurality of pulses 906. It should be noted that late stage starting mode 905 is shown wherein the modulation 907 of the signal has started to reach an over-modulated state. In late transition state 908 the PWM output has dropped most of its pulses 906. To transition to six-step mode 909 the carrier 901 is turned off, that is its value is set to zero rather than triangle wave. The normalised demanded voltages 902, 903, 904 are then being compared with zero, and the output phase voltages are switched at the zero-crossings 910. For example, the output phase voltage $v_a$ 911 is switched at the zero-crossings of the respective voltage reference 902. The carrier will be kept at zero if permanent six-step operation is desired after starting, or it may be turned on again for reversion to PWM at low speed as hereinabove described. Other means of changing to six step include the calculation of pulse widths as an extension of prior art dq to abc pulse width calculations in which the modulator is not a separate function.

The transition to six-step is accompanied by a jump in the fundamental voltage content, and voltage jumps give rise to current transients that can disturb the starting process. By transitioning at M=2 the difference in fundamental voltage content is very low and is acceptable. An alternative is to transition first to a pulse shape that has an intermediate fundamental voltage. This can be accomplished after the carrier is turned off by putting one or more notches (gaps) in the six-step pulses. Such notches are known in the art such as those set forth in U.S. Pat. Nos. 3,694,718, 3,423,662 and 4,245,290, and in selective harmonic elimination (SHE), to reduce the fundamental content of the output voltage. Implementing notching would allow the transition point $M_{max}$ to be set to a lower value such as $M_{max}=1.5$ and enables rapid voltage adjustments when running to compensate for the bus voltage control which tends to be slow when there is a large bus capacitance.

Another embodiment to avoid the current transient is to gradually reduce the amplitude of the triangular carrier waveform from 1 down to 0. This is equivalent to increasing the modulation index and can help move from point C to D in FIG. 5 within an acceptably short but defined time period.

Addition of SOGI-Based Filters

Figure 11:
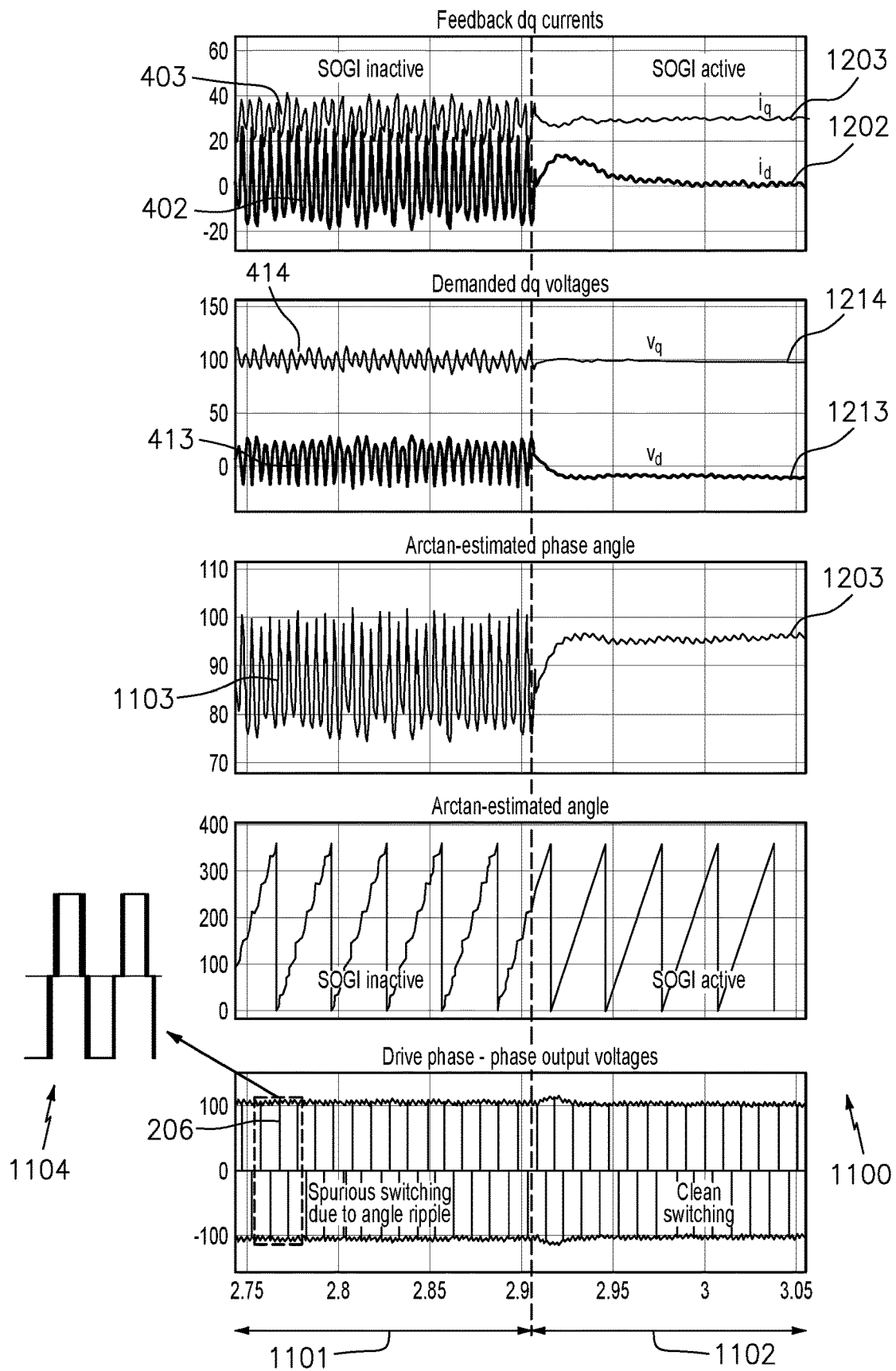
FIG. 11 is a graphical representation of the application of a control system in accordance with an embodiment of the present disclosure.

As disclosed herein above, the harmonic content of six step voltages and currents is high. The operation of the vector controller 400 of FIG. 4 herein above is based on the assumption that the voltage and current inputs 401 are sinusoidal. In this case the abc to dq transformation 404 results in essentially steady voltages $v_{dq}$ 413, 414 and currents $i_{dq}$ 402, 403. However, the harmonic content, when transformed, adds significant ripple to these quantities, and as a result the control can be compromised. Referring now to FIG. 11, the left-hand time interval 1101 illustrates the aforementioned significant ripples. With respect to the feedback currents $i_{dq}$ 402, 403 the ripple is clearly evident. As hereinbefore mentioned, in the prior art, six-step switching angles can be calculated directly from the angle of vector $v_{dq}$ using the arc-tangent of its components 413, 414 shown as 1103, shown for comparison purposes only. The resulting angle ripple in this example is approximately 20 degrees, which is very significant in that the typical load angle for a motor would be 30 degrees. The effect of this ripple can be seen on the inverter voltage output 206 as spurious voltage transitions as exemplified and shown in inset 1104. Although the present method does not use inverse tangent, the ripples in $v_{dq}$ need to be dealt with for optimum performance and reliable operation. There are high-frequency ripples from the harmonics but also low frequency fluctuations in the phase currents arising from volt-second imbalances in the six-step positive and negative line voltages. One cause of this is inaccuracy is in the implementation of the zero-crossing switching time. Typically, digital calculations are updated at regular time intervals. If the output voltage is only switched at the nearest such interval to the exact time of a zero-crossing, then the positive and negative output voltage pulses will differ slightly in duration. It has been discovered as part of the present disclosure that this is significant even for intervals of that are only a few percent of the pulse widths. Means of achieving accurate pulse widths include using a very short update interval, or a programmed delay timer set so that the switching will occur at the required zero-crossing time following a calculation update.

Figure 12:
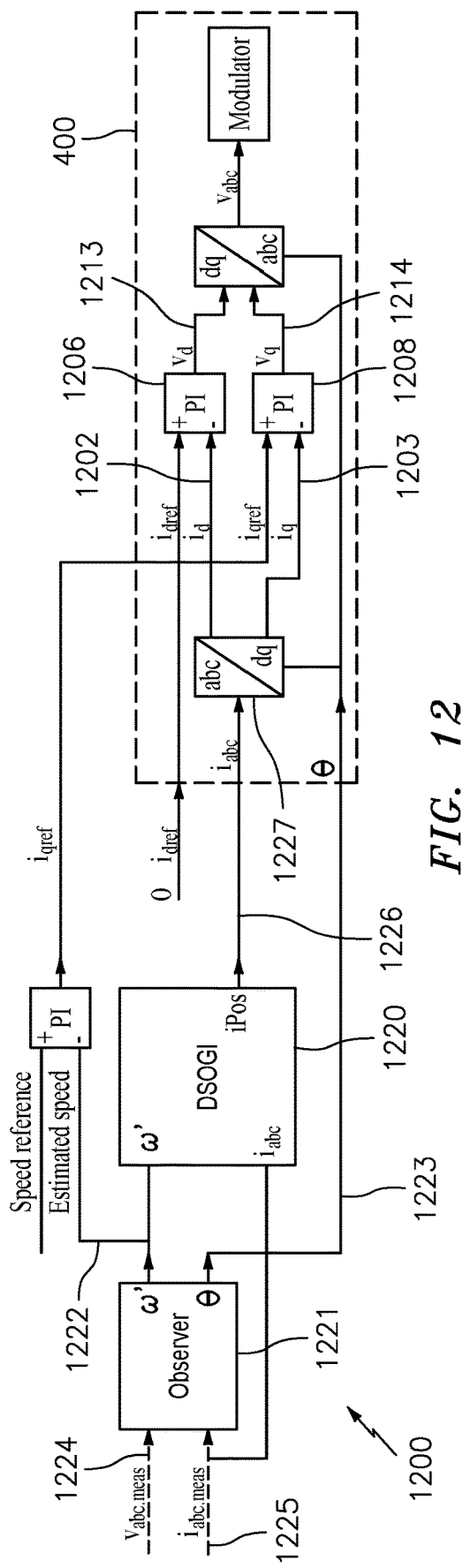
FIG. 12 is a schematic representation of a control system in accordance with the present disclosure.

Embodiments of the present disclosure address some of the aforementioned problems of various harmonic content on the voltage and current inputs to the observer by employing the structure of a Second-Order Generalised Integrator (SOGI), enhanced to suppress DC and low-frequency components of input signals such as those disclosed in co-pending U.S. patent application Ser. No. 16/488,359 (the '359 application), the disclosure of which is incorporated herein in its entirety. Two SOGI Quadrature Signal Generators (SOGI-QSGs) are used to create a Dual SOGI (DSOGI) 1220 (FIG. 12) structure, which has the ability to act as an adaptive band-pass filter (or integrator, depending on its internal configuration), around a given frequency. A DSOGI can resolve unbalanced currents into their positive and negative sequence currents, of which the positive sequence current is the component that is needed for proper operation of the vector controller 400. Referring now to FIG. 12, there is shown an observer 1221 used to estimate instantaneous speed 1222 and rotor angle 1223 from the drive output three phase measured voltage $v_{abc.meas}$ 1224 and three phase measured current $i_{abc.meas}$ 1225 or a parameter related thereto or reasonable equivalents. The measured phase voltages $v_{abc.meas}$ 1224 are typically derived from measured line (phase to phase) drive output voltages or from the measured bus voltage and the inverter switching state. Other means to derive measured phase voltages $v_{abc.meas}$ 1224 include recognising that the fundamental frequency component of the drive output voltage is usually sufficiently close to the demanded voltages of the controller (demanded voltage $v_{abc}$ 416 in FIG. 4) that these demanded voltages themselves may be used as reasonable equivalents to actual measurements. Since the three phase currents going to the load (motor 10 FIG. 1) must sum to zero, the three phase current measurement, as will be known to one skilled in the art, can if desired be made from just two actual measurements. The measured currents 1225 will however be distorted due to the six-step modulation as hereinabove described. Still referring to FIG. 12, passing these distorted three phase measured current $i_{abc.meas}$ 1225 signals to a DSOGI 1220 with a center frequency approximately equal to the motor electrical frequency and then feeding the DSOGI positive sequence current output 1226 to the phase current input 1227 of the vector controller 400 has a favourable effect, as the DSOGI suppresses both the high and low-frequency current harmonics, and the current imbalances. As a result of this novel use of a DSOGI 1220, the $v_d$ 1213 produced by PI controller 1206 and $v_q$ 1214 produced by the PI controller 1208 are much cleaner, which in turn greatly reduces the fluctuations at the demanded voltage amplitude and phase. This is very desirable, as these fluctuations can lead to further current distortion and resonances at the drive's DC link, while phase fluctuations can also generate additional voltage pulses in the area of crossing between successive inverter states (θ=30, 90, 150 . . . degrees) as hereinbefore described. The above stabilising actions prevent possible loss of control, over-current trips and motor stalling. Additional low-pass filters may be added on the resulting dq voltages 1213, 1214, if desired without departing from the scope of the present disclosure. Referring back to FIG. 11 the effects of filtering with the DSOGI 1220 of FIG. 12 are illustrated in the filtered portion 1102 of the graphical output 1100. The controller structure is presented in FIG. 12, while comparative simulation results are shown in FIG. 11. The dramatic reduction in ripple is evident as is the effect on the angle if calculated using arc tangent and the clean six-step switching. The above means of suppressing the effect of current harmonics on the observer 1221 is an important benefit of this embodiment of the present disclosure, but it does not reduce the effects they have on the motor 10.

It is known in the prior art to apply feedforward to vector controllers for PMM or induction motors in order to speed up the controller response to transients. The transformed motor currents $i_d$ 1202 and $i_q$ 1203 in FIG. 12 can be used respectively to calculate feedforward inductive or resistive voltage drops. It has been discovered that the distorted currents arising from six-step operation are not suited for feedforward, whereas a DSOGI filter is suited as their output currents are balanced and substantially free of harmonics. It will be readily apparent to one skilled in the art that $i_d$ and $i_q$ are also determined in other embodiments such as in FIG. 13. Feedforward can also be applied to both the negative sequence controller 1402 and the positive sequence controller 1401 in FIG. 14 and in FIG. 15 the negative sequence controller 1502 and the positive sequence controller 1501, discussed herein below.

Figure 13:
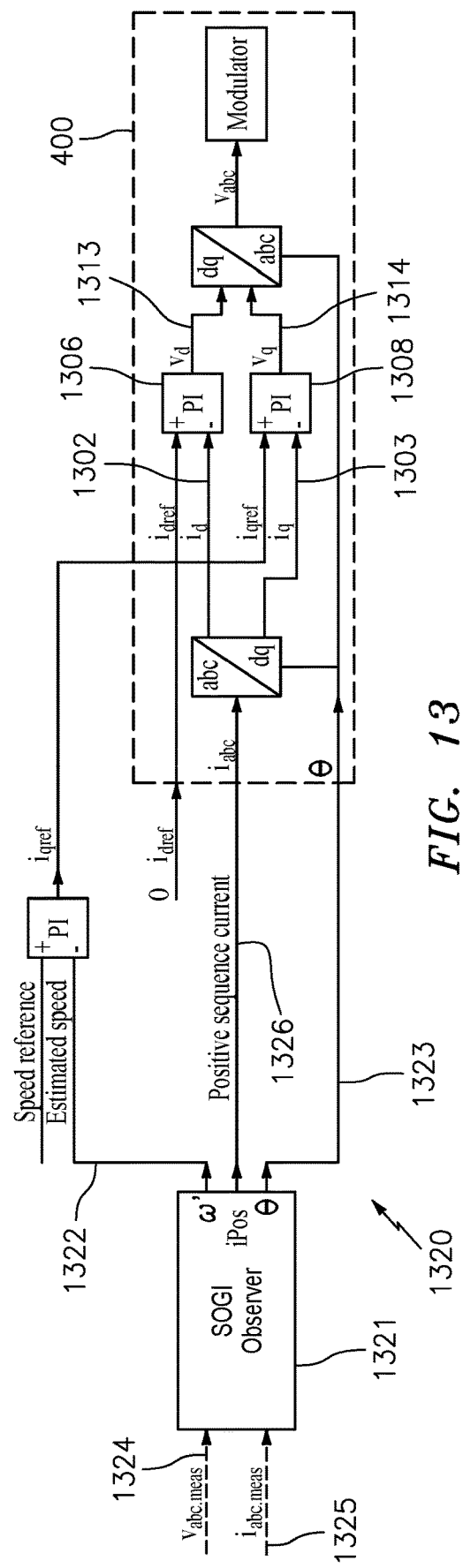
FIG. 13 is a schematic representation of a control system in accordance with the present disclosure.

In the foregoing it has been assumed that the angle observer 1221 is producing an accurate estimate of rotor angle 1223. However as disclosed in the '359 application, long cables can introduce current imbalance, and as discussed herein there is substantial harmonic distortion inherent in six-step voltages and the resulting motor currents. These can de-stabilise the observer 1221 or at the least result in further angle errors and fluctuations. Referring now to FIG. 13 there is shown an embodiment of motor controller 1320 that addresses both observer immunity and vector controller immunity and so provides a robust complete solution to the problems of six-step vector control of submersible pumping systems. In accordance with a novel aspect of the current disclosure, motor controller 1320 includes SOGI observer 1321 wherein the SOGI observer can comprise an mSOGI-2QSG PLL using a three phase measured voltage $v_{abc.meas}$ signal 1324 and a three phase measured current $i_{abc,meas}$ signal 1325 as input, as disclosed in the '359 application, to derive the iNeg, θ and ω' output, as well as iPos. The iPos output is provided by a DSOGI included in the mSOGI-2QSG PLL. The SOGI observer 1321, extracts balanced sinusoidal rotor flux estimates from the six-step output voltages and motor currents from which smooth and accurate estimated rotor angle 1323 and estimated speed 1322 are obtained by the phase-locked loop of the SOGI observer.

Figure 14:
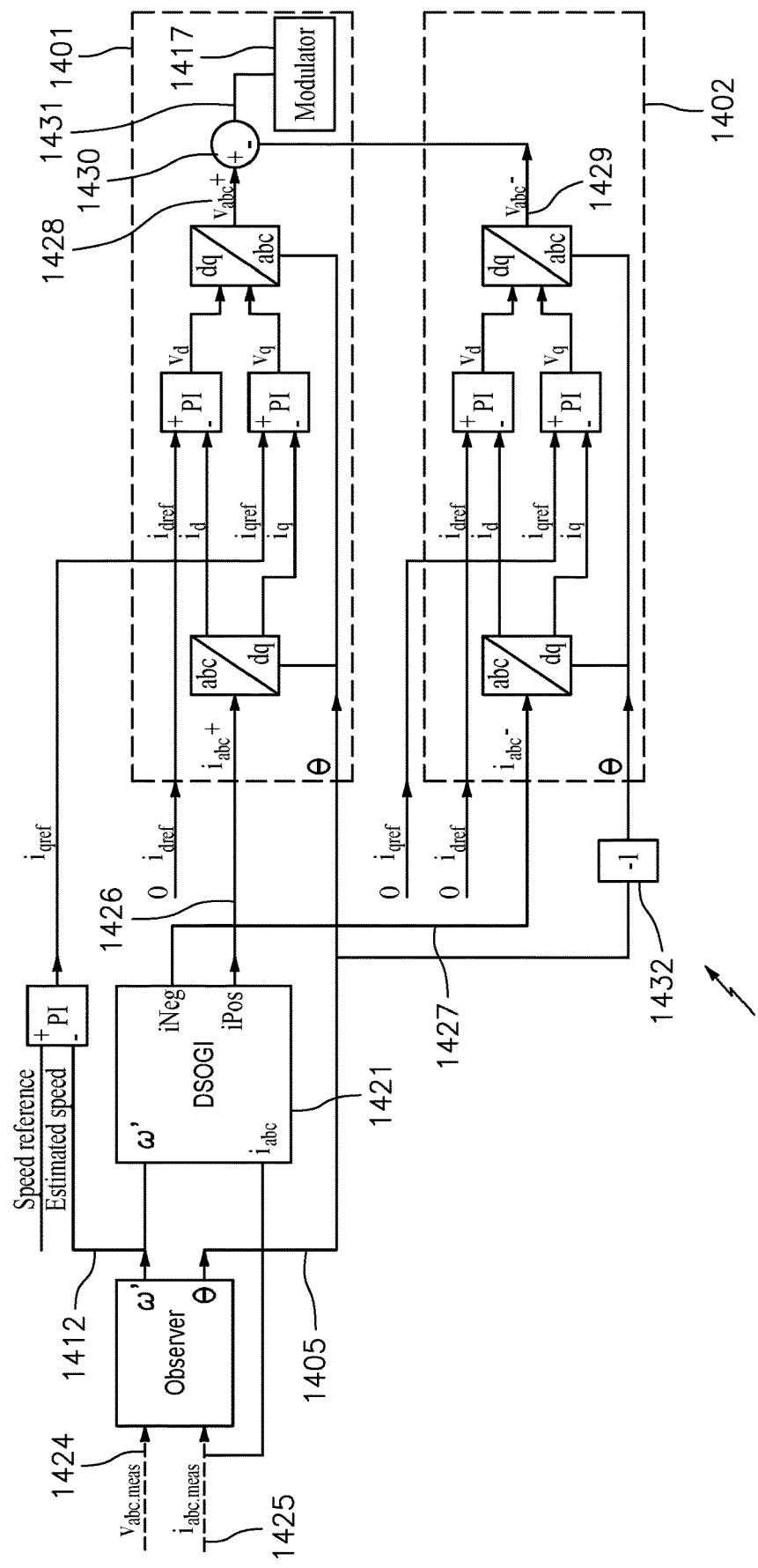
FIG. 14 is a schematic representation of a control system in accordance with the present disclosure.
Figure 15:
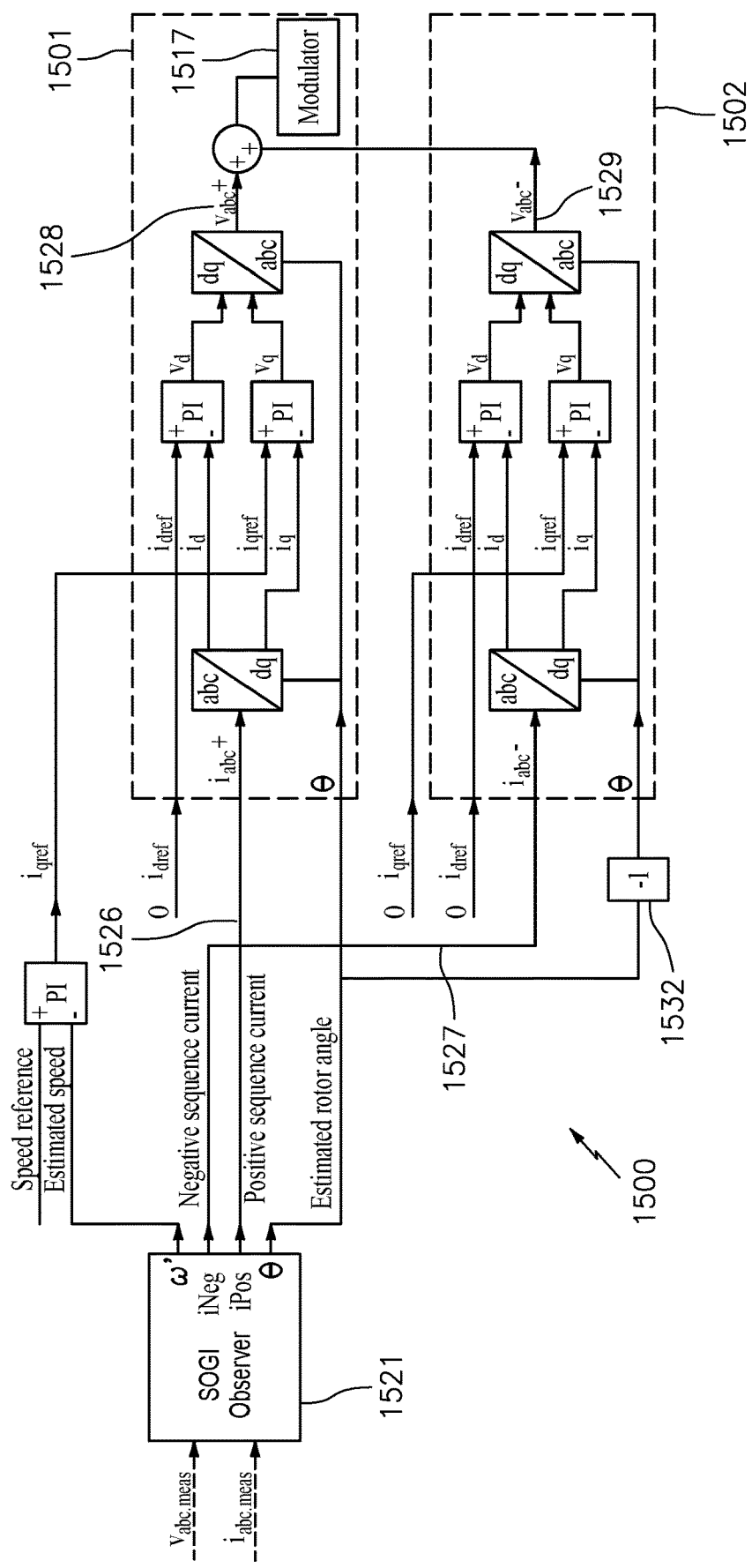
FIG. 15 is a schematic representation of a control system in accordance with the present disclosure.

The '359 application further discloses how to apply SOGIs to actively correct for current imbalance which appears when using long cables, by imbalancing the output voltages. In the context of the present disclosure, due to the generation of six step instead of PWM voltages, the method is not capable of completely eliminating the current imbalance. This is because whereas PWM permits the phase voltages to be individually adjusted while sharing the same bus voltage, in six-step the phase voltages are always essentially the same. However, because the controller action can vary the pulse timing, the individual phase voltage-second products and hence their fundamental voltage content, can be adjusted sufficiently for the negative-sequence current amplitude to be reduced substantially. Referring to FIG. 14 there in shown a motor controller 1420 that includes a novel method of current balancing using the basic DSOGI 1220 configuration in FIG. 12, but where novel use is now made of the DSOGI 1421 ability to produce both positive sequence current iPos 1426 and negative sequence current iNeg 1427 components of the measured currents. Positive sequence current $i_{abc}^+$ 1426 is used to drive positive sequence controller 1401 and negative sequence current $i_{abc-}$ 1427 along with negated estimated rotor angle 1432 are used to drive negative sequence controller 1402. The resulting positive sequence voltage $v_{abc}^+$ 1428 and negative sequence voltage $v_{abc-}$ 1429 are summed at summation calculator 1430 to produce the demanded voltage $v_{abc}$ 1431 which is fed to the modulator 1417. As hereinbefore explained, modulator 1417 may operate first in PWM and then in six-step mode. Similar to the current balancing motor controller 1420 of FIG. 14 as it relates to controller 1200, current balancing controller 1500 of FIG. 15 corresponds to motor controller 1320 of FIG. 13, in which the positive sequence current $i_{abc}^+$ 1526 and the negative sequence current $i_{abc-}$ 1527 are abc-direct outputs of the SOGI observer. The positive sequence voltage $v_{abc}^+$ 1528 and negative sequence voltage $v_{abc-}$ 1529 are summed at summation calculator to produce the demanded voltage which is fed to the modulator 1517. Although shown as including an observer in FIGS. 12 and 14, it will be appreciated by those skilled in the art that an angle encoder could provide the same input. These currents are available from the SOGI observer as disclosed in the '359 application, which however does not teach a use of the positive sequence current in this manner.

Figure 16:
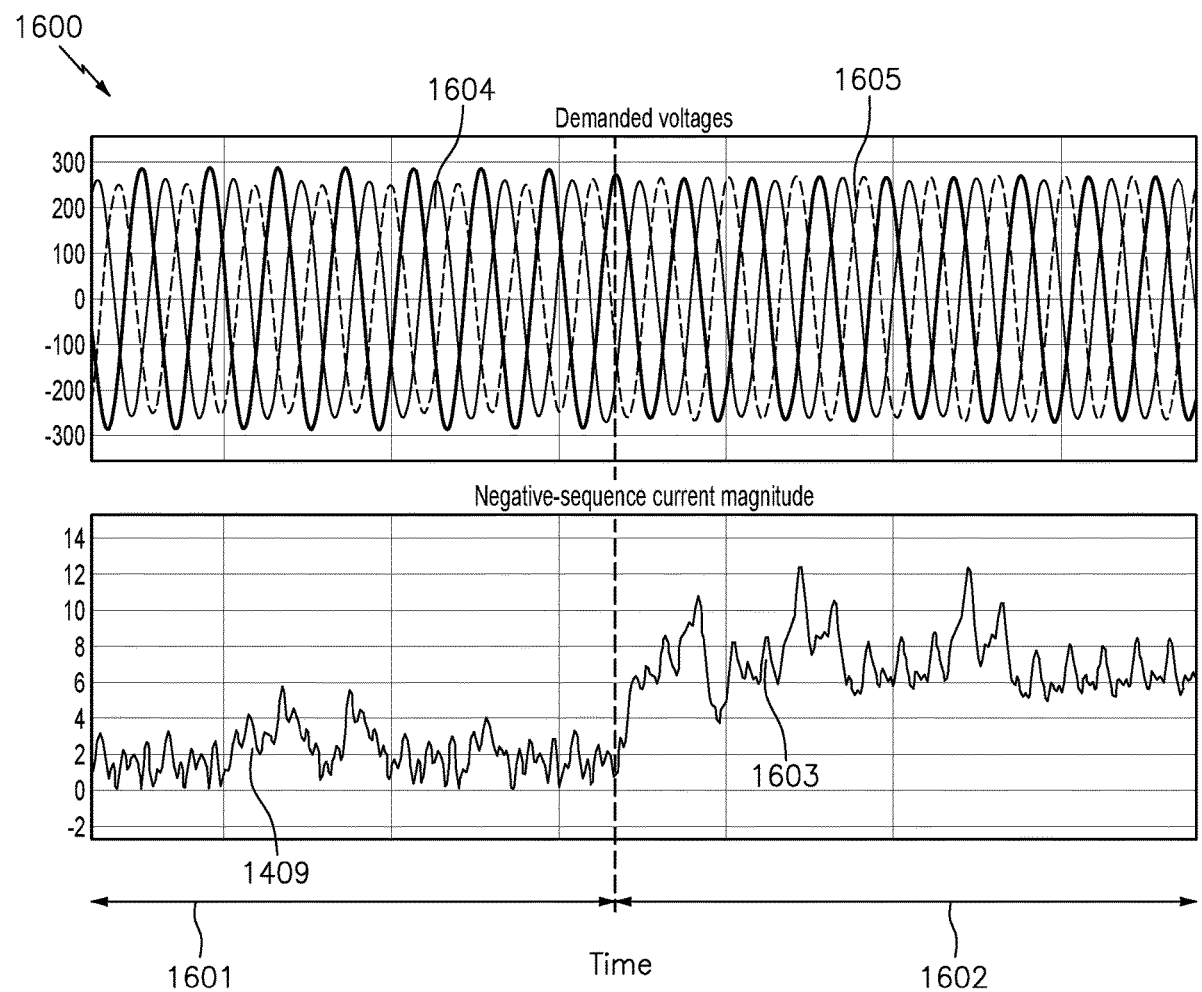
FIG. 16 is a graphical representation of current balancing application on imbalanced load in accordance with the present disclosure.

By way of example, FIG. 16 the graphical presentation 1600 shows the output of current balancing motor controller 1420 in FIG. 14 (or similarly, current balancing motor controller 1500 in FIG. 15) being used to control an imbalanced drive output current in the portion labeled 1601. The (relatively) low negative sequence current 1409 can be seen during first portion 1601. After a certain time, the correction is disabled (reverts to FIG. 12). The corrected negative sequence current 1409 increases by a factor of approximately two to negative sequence current 1603 in this example. The vector controller demanded three-phase voltages, specifically the demanded voltage $v_{abc}$ 1431, which are the sum of the positive sequence demand voltage $v_{abc}^+$ 1428 and negative sequence voltage $v_{abc-}$ 1429 are imbalanced demanded voltages 1604 in the first portion 1601 while driving the corrected currents, and revert to balanced demand voltages 1605 in the second portion 1602 when the correction is turned off.

The disclosed SOGI-based methods may be used individually or together. For example, the negative-sequence controllers 1402 in FIGS. 14 and 1502 in FIG. 15 which accept $i_{abc}^-$ (1427, 1527, respectively) as an input may be used independently of the derivation and use of $i_{abc}^+$ (1426, 1526, respectively) by the positive-sequence controllers 1401 in FIGS. 14 and 1501 in FIG. 15. That is, the negative-sequence controllers could be used to achieve current balancing, even if the positive-sequence controllers were supplied with the measured currents $i_{abc,meas}$ instead of the positive-sequence currents $i_{abc}^+$. This would of course result in loss of the advantages relating to DSOGI-based filtering, listed hereinabove. Moreover, the above SOGI-based methods work on all the voltage waveforms in the starting and running methods disclosed herein. This includes voltage notching of the six-step waveform and the critical phase of starting both in the overmodulation stage and in the early full PWM stage. They are thus also generally applicable to conventional PWM and six-step applications with fixed bus voltages. Finally, although use of an observer has been assumed in the presented embodiments to provide sensorless motor control, that could be substituted by an encoder in some applications.

OTHER APPLICATIONS OF DISCLOSURE

Figure 4:
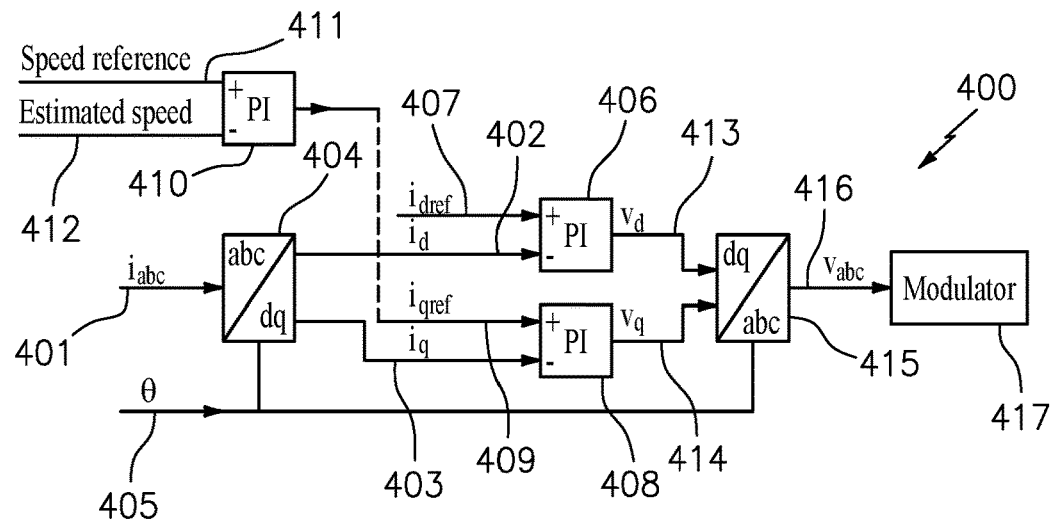
FIG. 4 is a schematic diagram of a three phase vector controller of the prior art.

The foregoing disclosure has extended the classic vector control structure in FIG. 4 from starting to pure six-step operation. For clarity it has mostly assumed the torque producing current reference $i_{qref}$ is set by a speed regulator, and the current reference $i_{dref}$ is set to zero. This is appropriate for PMMs. The disclosure applies equally to non-zero $i_{dref}$. For example, in vector control of IMs it is known to use $i_{dref}$ to set the rotor flux level.

When the bus voltage reaches its maximum value, the maximum speed will be reached as six-step produces the maximum possible fundamental voltage content. As is known, $i_{dref}$ can be used to offset the rotor flux in PMMs or reduce the rotor flux in IMs, in a process known as field-weakening. When this is done, the motor requires less voltage for a given speed, or conversely can produce more speed for the same voltage. The quid pro quo is reduced torque for a given phase current as some of this current is necessarily diverted from $i_{qref}$ to $i_{dref}$ and because the rotor magnetic field is weakened, so for the same stator current less torque is produced.

The present disclosure may usefully be applied to electric vehicles. For example, in the quest for maximum efficiency it is desired to operate at lower bus voltage when at lower speed, then increase the voltage to achieve higher speed. The present disclosure shows how this can be accomplished using a fixed bus voltage when starting and smoothly transitioning to six step as the speed increases, followed by field-weakening if needed for cruising.

Even in applications where the bus voltage is fixed throughout, the present disclosure shows how to use PWM at lower speeds and move smoothly to six-step and then field-weakening.

Further applications can be found in very high speed machines and very high power machines. The semiconductors used for driving such machines usually have unacceptably high power losses when switching at the rate needed for accurate PWM. In these cases, a variable bus voltage and six-step output is a known hardware approach and the method as disclosed herein provides a solution to the vector control problem.

The vector control method of FIG. 4 can be used with small changes to the modulator for brushless DC motor control. Brushless DC motors are PMMs optimised for a form of six step control in which as is known the phase voltages are set to the bus voltage during the six-step pulse, but the inverter drive turns off the phase output during the zero-voltage part of six-step. PWM varies the pulse width during what would otherwise be the six step pulse to reduce the effective pulse amplitude and hence speed. With the modification to turn the phase output off, the present disclosure applies in its entirety to vector control of brushless DC motors.

While the foregoing is directed to embodiments of the present disclosure, other and further embodiments of the disclosure may be devised without departing from the basic scope thereof, and the scope thereof is determined by the claims that follow.

What is claimed is:

1. A method of controlling a motor using an electric drive comprising:
   providing a bus reference voltage at a low bus voltage level;
   suppressing voltage reflections with the low bus voltage level;
   determining a measured bus voltage;
   controlling a bus voltage demand in dependence with the measured bus voltage and the bus reference voltage;
   operating a modulator of the electric drive in a PWM starting mode;
   wherein the PWM starting mode comprises operating the modulator at a predetermined low switching rate and at the low bus voltage level;
   starting the motor in the PWM starting mode; and
   increasing a motor speed using the PWM starting mode.

2. The method of claim 1, the method further comprising:
   monitoring a measured modulation index M;
   providing a maximum modulation index $M_{max}$;
   comparing the measured modulation index M to the maximum modulation index $M_{max}$; and
   transitioning to a six-step running mode from the PWM starting mode when M is substantially equal to $M_{max}$.

3. The method of claim 2 further comprising:
   providing a reference modulation index $M_{ref}$ for the six-step running mode;
   regulating a bus voltage level such that M is substantially equal to $M_{ref}$; and
   increasing the motor speed to a predetermined operating speed in the six-step running mode.

4. The method of claim 3 further comprising:
   determining a rotor angle and the motor speed from any of a measured rotor angle and a measured motor speed using an encoder, or an estimated rotor angle and an estimated motor speed based on any of a starting speed profile and an observer; and
   supplying the rotor angle and the motor speed to the electric drive.

5. The method of claim 4, further comprising:
   determining a reference current $i_{qref}$ and a direct reference current $i_{dref}$;
   determining a three phase measured current $i_{abc.meas}$;
   supplying the $i_{qref}$ and the $i_{dref}$ and the three phase measured current $i_{abc.meas}$ and the rotor angle to a vector controller of the electric drive;
   operating the vector controller in dependence of the $i_{qref}$, the $i_{dref}$ and $i_{abc.meas}$ and the rotor angle and determining a direct voltage $v_d$ and a quadrature voltage $v_q$ and calculating a vector voltage magnitude $|v|$;
   determining a calculated modulation index using $M_{ref}$ and the vector voltage magnitude $|v|$;
   determining a set of demanded voltages $v_{abc}$;
   determining a set of zero-crossings of the set of demanded voltages $v_{abc}$;
   operating the modulator of the electric drive on the set of zero-crossings and producing a six-step waveform; and
   supplying the six-step waveform to the motor.

6. The method of claim 5, wherein the electric drive comprises an adaptive band-pass filter, the adaptive band-pass filter receiving the estimated motor speed and the three phase measured current $i_{abc.meas}$ and producing at least one of a positive sequence current $i_{abc}^+$ and a negative sequence current $i_{abc}^-$.

7. The method of claim 6 wherein the adaptive band-pass filter comprises a Dual Second-Order Generalised Integrator (DSOGI), the method further comprising:
   operating the DSOGI in dependence of any of the measured motor speed or the estimated motor speed and in dependence of the three phase measured current $i_{abc.meas}$ and supplying the at least one of the $i_{abc}^+$ and the $i_{abc}^-$ to the electric drive.

8. The method of claim 7 wherein the electric drive comprises a positive sequence controller, the method further comprising:
   supplying the $i_{abc}^+$ to the positive sequence controller;
   operating the positive sequence controller in dependence of the rotor angle, the $i_{qref}$, the $i_{dref}$ and the $i_{abc}^+$ and producing a positive sequence voltage;
   operating the modulator in dependence of the positive sequence voltage and producing the six-step waveform; and
   supplying the six-step waveform to the motor.

9. The method of claim 7, the method further comprising:
   wherein the electric drive comprises a positive sequence controller and a negative sequence controller;
   operating the negative sequence controller in dependence of a negative of the rotor angle, a zero value of the $i_{qref}$ and a zero value of the $i_{dref}$ and the negative sequence current $i_{abc}^-$ and producing a negative sequence voltage;
   operating the positive sequence controller in dependence of the rotor angle, the $i_{qref}$ and the $i_{dref}$ and the $i_{abc}^+$ and producing a positive sequence voltage;
   operating the modulator in dependence of a summing of the negative sequence voltage and the positive sequence voltage and producing the six-step waveform; and
   supplying the six-step waveform to the motor.

10. The method of claim 5, wherein the electric drive comprises a positive sequence controller and the observer comprises a Second-Order Generalised Integrator (SOGI) observer, the method further comprising:
    operating the SOGI observer in dependence of any of the set of demanded voltages $v_{abc}$ and a three phase measured voltage $v_{abc.meas}$ and in further dependence of the three phase measured current $i_{abc.meas}$ and producing a positive sequence current $i_{abc}^+$; and
    supplying the $i_{abc}^+$ to the positive sequence controller;
    operating the positive sequence controller in dependence of the rotor angle, the $i_{qref}$, the $i_{dref}$ and the $i_{abc}^+$ and producing a positive sequence voltage;

operating the modulator in dependence of the positive sequence voltage and producing the six-step waveform; and supplying the six-step waveform to the motor.

11. The method of claim 10 wherein the electric drive further comprises a negative sequence controller, the method further comprising:

operating the SOGI observer in dependence of any of the set of demanded voltages $v_{abc}$ and a three phase measured voltage $v_{abc.meas}$ and the three phase measured current $i_{abc.meas}$ and producing a negative sequence current $i_{abc}^-$; and supplying the $i_{abc}^+$ to the positive sequence controller and the $i_{abc}^-$ to the negative sequence controller;

operating the negative sequence controller in dependence of a negative of the rotor angle, a zero value of the $i_{qref}$ and a zero value of the $i_{dref}$, and the $i_{abc}^-$ and producing a negative sequence voltage;

operating the positive sequence controller in dependence of the rotor angle, the $i_{qref}$ and the $i_{dref}$ and the $i_{abc}^+$ and producing a positive sequence voltage;

operating the modulator in dependence of a summing of the negative sequence voltage and the positive sequence voltage and producing the six-step waveform; and supplying the six-step waveform to the motor.

12. The method of claim 2, further comprising:

decreasing the motor speed using the six-step running mode; and transitioning to a PWM mode from the six-step running mode.

13. A system for controlling a motor comprising:

an electric drive having a modulator and a computer, the electric drive electrically coupled to the motor and configured to:

provide a bus reference voltage to the computer at a low bus voltage level;

suppress voltage reflections with the low bus voltage level;

measure a measured bus voltage;

control a bus voltage demand in dependence with the measured bus voltage and the bus reference voltage;

the modulator configured to start the motor in a PWM starting mode and configured to increase a motor speed using the PWM starting mode; and wherein the PWM starting mode comprises operating the modulator at a predetermined low switching rate and at the low bus voltage level.

14. The system for controlling a motor of claim 13 further comprising:

a modulation index calculator configured to determine a measured modulation index M;

wherein the electric drive is further configured to:

monitor the measured modulation index M;

provide a maximum modulation index $M_{max}$;

compare the measured modulation index M to the maximum modulation index $M_{max}$; and the modulator is further configured to transition to a six-step running mode from the PWM starting mode when M is substantially equal to $M_{max}$.

15. The system for controlling a motor of claim 14 wherein the electric drive is further configured to:

provide a reference modulation index $M_{ref}$ for the six-step running mode;

regulate a bus voltage level such that M is substantially equal to $M_{ref}$; and increase the motor speed to a predetermined operating speed in the six-step running mode.

16. The system for controlling a motor of claim 15 further comprising:

any of an encoder coupled to the motor, a starting speed profile and an observer;

wherein the electric drive is further configured to:

determine a rotor angle and the motor speed from any of a measured rotor angle and a measured motor speed using the encoder, or an estimated rotor angle and an estimated motor speed based on any of the starting speed profile and the observer; and inputting the rotor angle and the motor speed to the computer.

17. The system for controlling a motor of claim 16 further comprising:

the electric drive comprises a vector controller configured to receive a reference current $i_{qref}$ and a direct reference current $i_{dref}$ and a three phase measured current $i_{abc.meas}$ and the rotor angle;

the vector controller further configured to:

operate in dependence of the $i_{qref}$, the $i_{dref}$ and $i_{abc.meas}$ and the rotor angle;

determine a direct voltage $v_d$ and a quadrature voltage $v_q$ and calculate a vector voltage magnitude |v|;

determine a calculated modulation index using $M_{ref}$ and the vector voltage magnitude |v|;

determine a set of demanded voltages $v_{abc}$;

determine a set of zero-crossings of the set of demanded voltages $v_{abc}$;

operate the modulator of the electric drive on the set of zero-crossings and producing a six-step waveform; and supply the six-step waveform to the motor.

18. The system for controlling a motor of claim 17, wherein the electric drive comprises an adaptive band-pass filter, the adaptive band-pass filter configured to receive the estimated motor speed and the three phase measured current $i_{abc.meas}$ and to produce at least one of a positive sequence current $i_{abc}^+$ and a negative sequence current $i_{abc}^-$.

19. The system for controlling a motor of claim 18 wherein the adaptive band-pass filter comprises a Dual Second-Order Generalised Integrator (DSOGI) configured to operate in dependence of any of the measured motor speed or the estimated motor speed and in dependence of the three phase measured current $i_{abc.meas}$ and further configured to supply the at least one of the $i_{abc}^+$ and the $i_{abc}^-$ to the electric drive.

20. The system for controlling a motor of claim 19 further comprising:

a positive sequence controller;

the DSOGI further configured to supply the $i_{abc}^+$ to the positive sequence controller;

the positive sequence controller further configured to operate in dependence of the rotor angle, the $i_{qref}$, the $i_{dref}$ and the $i_{abc}^+$ and to produce a positive sequence voltage; and the modulator configured to operate in dependence of the positive sequence voltage and producing the six-step waveform and to supply the six-step waveform to the motor.

21. The system for controlling a motor of claim 19 further comprising a negative sequence controller configured to operate in dependence of a negative of the rotor angle, a zero value of the $i_{qref}$ and a zero value of the $i_{dref}$, and the negative sequence current $i_{abc}^-$ and to produce a negative sequence voltage;

a positive sequence controller configured to operate in dependence of the rotor angle, the $i_{qref}$ and the $i_{dref}$ and the $i_{abc}^+$ and to produce a positive sequence voltage;

the modulator further configured to operate in dependence of a summing of the negative sequence voltage and the positive sequence voltage and to produce the six-step waveform; and wherein the electric drive is further configured to supply the six-step waveform to the motor.

22. The system for controlling a motor of claim 17 further comprising:

a positive sequence controller;

a Second-Order Generalised Integrator (SOGI) observer configured to operate in dependence of any of the set of demanded voltages $v_{abc}$ and a three phase measured voltage $v_{abc.meas}$ and in further dependence of the three phase measured current $i_{abc.meas}$ and to produce a positive sequence current $i_{abc}^+$; and wherein the positive sequence controller is configured to operate in dependence of the rotor angle, the $i_{qref}$, the $i_{dref}$ and the $i_{abc}^+$ and to produce a positive sequence voltage; and wherein the modulator is configured to operate in dependence of the positive sequence voltage and to produce the six-step waveform and to supply the six-step waveform to the motor.

23. The system for controlling a motor of claim 22 further comprising;

a negative sequence controller;

the SOGI observer configured to operate in dependence of any of the set of demanded voltages $v_{abc}$ and a three phase measured voltage $v_{abc.meas}$ and the three phase measured current $i_{abc.meas}$ and to produce a negative sequence current $i_{abc}^-$;

supplying the $i_{abc}^+$ to the positive sequence controller and the $i_{abc}^-$ the negative sequence controller;

the negative sequence controller configured to operate in dependence of a negative of the rotor angle, a zero value of the $i_{qref}$ and a zero value of the $i_{dref}$ and the $i_{abc}^-$ and to produce a negative sequence voltage;

the positive sequence controller configured to operate in dependence of the rotor angle, the $i_{qref}$ and the $i_{dref}$ and the $i_{abc}^+$ and producing a positive sequence voltage; and the modulator configured to operate in dependence of a summing of the negative sequence voltage and the positive sequence voltage, to produce the six-step waveform and to supply the six-step waveform to the motor.

24. The system for controlling a motor of claim 14, further comprising:

the electric drive is further configured to decrease the motor speed in the six-step running mode; and the modulator is further configured to transition to a PWM mode from the six-step running mode.

25. A downhole pumping system comprising:

a pump;

a motor mechanically coupled to the pump;

an electric drive having a modulator and a computer, the electric drive electrically coupled to the motor and configured to:

provide a bus reference voltage to the computer at a low bus voltage level;

suppress voltage reflections with the low bus voltage level;

measure a measured bus voltage;

control a bus voltage demand in dependence with the measured bus voltage and the bus reference voltage;

the modulator configured to start the motor in a PWM starting mode and configured to increase a motor speed using the PWM starting mode; and wherein the PWM starting mode comprises operating the modulator at a predetermined low switching rate and at the low bus voltage level.

26. The downhole pumping system of claim 25 further comprising:

a modulation index calculator configured to determine a measured modulation index M;

wherein the electric drive is further configured to:

monitor the measured modulation index M;

provide a maximum modulation index $M_{max}$;

compare the measured modulation index M to the maximum modulation index $M_{max}$; and the modulator is further configured to transition to a six-step running mode from the PWM starting mode when M is substantially equal to $M_{max}$.

27. The downhole pumping system of claim 26 wherein the electric drive is further configured to:

provide a reference modulation index Mref for the six-step running mode;

regulate a bus voltage level such that M is substantially equal to Mref; and increase the motor speed to a predetermined operating speed in the six-step running mode.

28. The downhole pumping system of claim 27 further comprising:

any of an encoder coupled to the motor, a starting speed profile and an observer;

wherein the electric drive is further configured to:

determine a rotor angle and the motor speed from any of a measured rotor angle and a measured motor speed using the encoder, or an estimated rotor angle and an estimated motor speed based on any of the starting speed profile and the observer; and inputting the rotor angle and the motor speed to the computer.

29. The downhole pumping system of claim 28, wherein the electric drive comprises a vector controller, the downhole pumping system further comprising:

the electric drive comprises a vector controller configured to receive a reference current $i_{qref}$ and a direct reference current $i_{dref}$ and a three phase measured current $i_{abc.meas}$ and the rotor angle;

the vector controller further configured to:

operate in dependence of the $i_{qref}$, the $i_{dref}$ and $i_{abc.meas}$ and the rotor angle;

determine a direct voltage $v_d$ and a quadrature voltage $v_q$ and calculate a vector voltage magnitude |v|;

determine a calculated modulation index using $M_{ref}$ and the vector voltage magnitude |v|;

determine a set of demanded voltages $v_{abc}$;

determine a set of zero-crossings of the set of demanded voltages $v_{abc}$;

operate the modulator of the electric drive on the set of zero-crossings and producing a six-step waveform; and supply the six-step waveform to the motor.

30. The downhole pumping system of claim 29, wherein the electric drive comprises an adaptive band-pass filter, the adaptive band-pass filter configured to receive the estimated motor speed and the three phase measured current $i_{abc.meas}$ and to produce at least one of a positive sequence current $i_{abc}^+$ and a negative sequence current $i_{abc}^-$.

31. The downhole pumping system of claim 30, wherein the adaptive band-pass filter comprises a Dual Second-Order Generalised Integrator (DSOGI) configured to operate in dependence of any of the measured motor speed or the estimated motor speed and in dependence of the three phase measured current $i_{abc.meas}$ and further configure to supply the at least one of the $i_{abc}^+$ and the $i_{abc}^-$ to the electric drive.

32. The downhole pumping system of claim 31 further comprising:
   a positive sequence controller;
   the DSOGI further configured to supply the $i_{abc}^+$ to the positive sequence controller;
   the positive sequence controller further configured to operate in dependence of the rotor angle, the $i_{qref}$, the $i_{dref}$ and the $i_{abc}^+$ and to produce a positive sequence voltage; and
   the modulator configured to operate in dependence of the positive sequence voltage and producing the six-step waveform and to supply the six-step waveform to the motor.

33. The downhole pumping system of claim 31 further comprising a negative sequence controller configured to operate in dependence of a negative of the rotor angle, a zero value of the $i_{qref}$ and a zero value of the $i_{dref}$ and the negative sequence current $i_{abc}^-$ and to produce a negative sequence voltage;
   positive sequence controller configured to operate in dependence of the rotor angle, the $i_{qref}$ and the $i_{dref}$ and the $i_{abc}^+$ and to produce a positive sequence voltage;
   the modulator further configured to operate in dependence of a summing of the negative sequence voltage and the positive sequence voltage and to produce the six-step waveform; and
   wherein the electric drive is further configured to supply the six-step waveform to the motor.

34. The downhole pumping system of claim 29 further comprising:
   a positive sequence controller;
   a Second-Order Generalised Integrator (SOGI) observer configured to operate in dependence of any of the set of demanded voltages $v_{abc}$ and a three phase measured voltage $v_{abc.meas}$ and in further dependence of the three phase measured current $i_{abc.meas}$ and to produce a positive sequence current $i_{abc}^+$; and
   wherein the positive sequence controller is configured to operate in dependence of the rotor angle, the iqref, the idref, and the iabc+ and to produce a positive sequence voltage; and
   wherein the modulator is configured to operate in dependence of the positive sequence voltage and to produce the six-step waveform and to supply the six-step waveform to the motor.

35. The downhole pumping system of claim 34 further comprising;
   a negative sequence controller;
   the SOGI observer configured to operate in dependence any of the set of demanded voltages $v_{abc}$ and a three phase measured voltage $v_{abc.meas}$ and the three phase measured current $i_{abc.meas}$ and to produce a negative sequence current $i_{abc}^-$;
   supplying the $i_{abc}^+$ to the positive sequence controller and the $i_{abc}^-$ to the negative sequence controller;
   the negative sequence controller configured to operate in dependence of a negative of the rotor angle, a zero value of the $i_{qref}$ and a zero value of the $i_{dref}$ and the $i_{abc}^-$ and to produce a negative sequence voltage;
   the positive sequence controller configured to operate in dependence of the rotor angle, the $i_{qref}$ and the $i_{dref}$ and the $i_{abc}^+$ and producing a positive sequence voltage; and
   the modulator configured to operate in dependence of a summing of the negative sequence voltage and the positive sequence voltage, to produce the six-step waveform and to supply the six-step waveform to the motor.

36. The downhole pumping system of claim 26, further comprising:
   the electric drive is further configured to decrease the motor speed in the six-step running mode; and
   the modulator is further configured to transition to a PWM mode from the six-step running mode.

* * * * *